United States Patent
Cheon et al.

(10) Patent No.: US 10,922,011 B2
(45) Date of Patent: Feb. 16, 2021

(54) CONTROLLERS CONFIGURED TO PERFORM SECURE DELETION, KEY-VALUE STORAGE DEVICES INCLUDING SAID CONTROLLERS, AND METHODS OF OPERATION THEREOF

(71) Applicant: Samsung Electronics Co., Ltd., Suwon-si (KR)

(72) Inventors: Jeong-ha Cheon, Suwon-si (KR); Ji-hwan Kim, Seoul (KR); Chan-ik Park, Seongnam-si (KR); Sang jin Oh, Suwon-si (KR)

(73) Assignee: Samsung Electronics Co., Ltd.

( * ) Notice: Subject to any disclaimer, the term of this patent is extended or adjusted under 35 U.S.C. 154(b) by 57 days.

(21) Appl. No.: 16/381,671

(22) Filed: Apr. 11, 2019

(65) Prior Publication Data

US 2019/0317688 A1 Oct. 17, 2019

(30) Foreign Application Priority Data

Apr. 12, 2018 (KR) .................. 10-2018-0042923
Feb. 26, 2019 (KR) .................. 10-2019-0022579

(51) Int. Cl.
*G06F 12/00* (2006.01)
*G06F 3/06* (2006.01)

(52) U.S. Cl.
CPC .......... *G06F 3/0652* (2013.01); *G06F 3/0608* (2013.01); *G06F 3/0659* (2013.01); *G06F 3/0679* (2013.01)

(58) Field of Classification Search
CPC .... G06F 3/0652; G06F 3/0608; G06F 3/0659; G06F 3/0679
See application file for complete search history.

(56) References Cited

U.S. PATENT DOCUMENTS

| 8,130,554 | B1 | 3/2012 | Linnell |
| 8,250,380 | B2 | 8/2012 | Guyot |
| 9,262,500 | B2 | 2/2016 | Kinoshita |
| 9,317,422 | B1 | 4/2016 | Winters |
| 9,438,426 | B2 | 9/2016 | Li |
| 9,785,547 | B2 * | 10/2017 | Takabatake ........... G06F 3/0652 |
| 2002/0026436 | A1 * | 2/2002 | Joory ..................... G06F 16/27 |
| 2012/0265926 | A1 * | 10/2012 | Tal ......................... G06F 11/108 |
| | | | 711/103 |
| 2013/0275656 | A1 * | 10/2013 | Talagala .............. G06F 12/0246 |
| | | | 711/103 |
| 2015/0074084 | A1 | 3/2015 | Bogrett |

(Continued)

*Primary Examiner* — John A Lane
(74) *Attorney, Agent, or Firm* — Myers Bigel, P.A.

(57) ABSTRACT

Provided are a controller configured to perform secure deletion, a key-value storage device including the controller, and a method of operating the key-value storage device. The key-value storage device includes a non-volatile memory including a plurality of blocks, and a controller configured to control a memory operation on the non-volatile memory, receive a write command including a first key and a first value corresponding to the first key from a host, write data of a file corresponding to the first value to at least one block of the plurality of blocks of the non-volatile memory in response to the write command, receive a secure deletion command for the first value from the host, and erase the at least one block to which the first value is written, in response to the secure deletion command.

20 Claims, 18 Drawing Sheets

(56) References Cited

U.S. PATENT DOCUMENTS

| | | |
|---|---|---|
| 2016/0041918 A1 | 2/2016 | Jeong |
| 2018/0032541 A1* | 2/2018 | Park ................... G06F 21/6218 |
| 2019/0258729 A1* | 8/2019 | Jeon ..................... G06F 16/221 |

* cited by examiner

FIG. 5

| KEY | BLK | PAGE |
|---|---|---|
| KEY 1 | BLK 1 | PAGE 1 |
| | ⋮ | ⋮ |
| | BLK 1 | PAGE A |
| | BLK 2 | PAGE 1 |
| | ⋮ | ⋮ |
| | BLK 2 | PAGE B |
| KEY 2 | BLK 3 | PAGE 1 |
| | ⋮ | ⋮ |
| | BLK 3 | PAGE C |

CONTROLLERS CONFIGURED TO PERFORM SECURE DELETION, KEY-VALUE STORAGE DEVICES INCLUDING SAID CONTROLLERS, AND METHODS OF OPERATION THEREOF

CROSS-REFERENCE TO RELATED APPLICATIONS

This application claims the benefit of Korean Patent Application No. 10-2018-0042923, filed on Apr. 12, 2018, and Korean Patent Application No. 10-2019-0022579, filed on Feb. 26, 2019, in the Korean Intellectual Property Office, the entire contents of both of which are incorporated herein by reference.

BACKGROUND

The inventive concepts relate to storage devices, and more particularly, to controllers configured to perform secure deletion, key-value storage devices including said controllers, and methods of operation thereof.

Storage devices may be divided into object-based storage and block-based storage according to a data management unit. The object-based storage may be a storage structure configured to store and manage data in an object format. An object may be data that may have an arbitrary size. For example, the object may mean multimedia data or files, such as moving and/or still images. An object storage may be used to manage the object. An example of the object-based storage may be a key-value storage device.

In the key-value storage device, when deletion of data is required, a data deletion operation may be performed using a logical erase operation, such as an operation of removing mapping information. Removing the mapping information may not immediately result in the physical removal of the data. In some cases, the key-value storage device may perform a garbage collection (GC) operation at some point and physically erase the data. However, in this case, the data may still remain in the storage for a long time, which may result in a security vulnerability with respect to the key-value storage device. For example, the data may still be vulnerable to access prior to being physically erased by the GC operation.

SUMMARY

The inventive concepts provide controllers, which may enhance data security and increase data use efficiency, key-value storage devices including said controllers, and methods of operating the key-value storage devices.

According to an aspect of the inventive concepts, there is provided a key-value storage device including a non-volatile memory including a plurality of blocks, and a controller configured to control a memory operation on the non-volatile memory, receive a write command including a first key and a first value corresponding to the first key from a host, write data of a file corresponding to the first value to at least one block of the plurality of blocks of the non-volatile memory in response to the write command, receive a secure deletion command for the first value from the host, and erase the at least one block to which the first value is written in response to the secure deletion command.

According to another aspect of the inventive concepts, there is provided a controller including at least one processor, and a working memory configured to store programs executable by the at least one processor, the working memory configured to store mapping information between a key from a host and a physical address of a non-volatile memory. The at least one processor is configured to receive a secure deletion command for a first value from the host, execute a secure deletion control module including at least one program stored in the working memory in response to the secure deletion command, and control an erase operation on at least one block of the non-volatile memory, in which the first value is stored.

According to another aspect of the inventive concepts, there is provided a method of operating a key-value storage device. The method includes receiving a write command including a first key and a first value corresponding to the first key from a host and writing data of a file corresponding to the first value to at least one block of the plurality of blocks of the non-volatile memory in response to the write command, receiving a secure deletion command for the first value from the host and determining the at least one block to which the first value is written, in response to the secure deletion command, and erasing the at least one block.

According to another aspect of the inventive concepts, there is provided a key-value storage device including a non-volatile memory comprising a plurality of blocks and a controller. The controller is configured to perform operations including receiving a secure deletion command comprising first data from a host, wherein the first data comprises a first key having a variable size, determining at least one block of the plurality of blocks of the non-volatile memory that contains a first value corresponding to the first key, erasing the at least one block that contains the first value in response to the secure deletion command, and after erasing the at least one block, providing a response to the secure deletion command to the host.

BRIEF DESCRIPTION OF THE DRAWINGS

Embodiments of the inventive concepts will be more clearly understood from the following detailed description taken in conjunction with the accompanying drawings in which:

FIG. 5 illustrates a table showing an example of mapping information between keys and physical addresses;

DETAILED DESCRIPTION

Hereinafter, embodiments will be described in detail with reference to the accompanying drawings.

Figure 1:
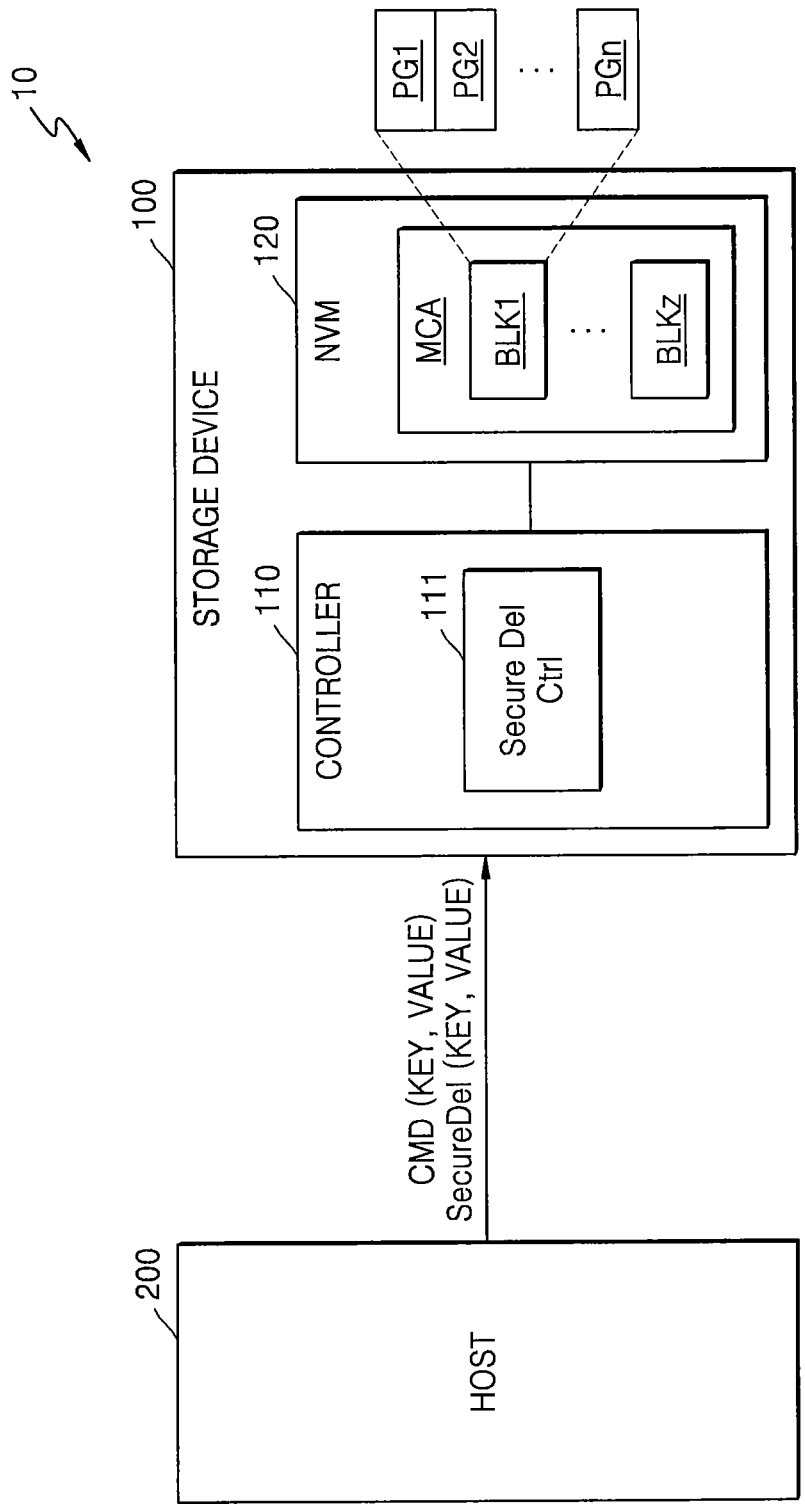
FIG. 1 is a block diagram of a storage system according to an embodiment of the inventive concepts.

FIG. 1 is a block diagram of a storage system 10 according to an embodiment of the inventive concepts.

Referring to FIG. 1, the storage system 10 may include a storage device 100 and a host 200, and the storage device 100 may include a controller 110 and a non-volatile memory 120. The host 200 may communicate with the storage device 100 through various interfaces. For example, the host 200 may include an application processor (AP) or a System-on-Chip (SoC).

In an embodiment, the storage device 100 may be a key-value storage device or a key-value store. For example, the storage device 100 may be a key-value solid-state drive (SSD). The key-value storage device may be configured to process data rapidly and simply using a key-value pair. Here, the "key-value pair" may mean a pair of a key KEY having uniqueness and a value VALUE, which is data corresponding to the key KEY, and be referred to as a "tuple" or a "key-value tuple." In the key-value pair, the key KEY may be denoted by an arbitrary string, such as a file name, a uniform resource identifier (URI), or a hash, and the value VALUE may be an arbitrary kind of file data, such as an image, a user preference file, or a document. In some embodiments, sizes of the key KEY and the value VALUE may be variable. For example, the size of the value VALUE may be changed according to data included in the value VALUE.

Hereinafter, an embodiment in which the storage device 100 is a key-value storage device will mainly be described. As used herein, the storage device 100 may be substantially synonymous with the key-value storage device or the key-value store. However, the storage device 100 is not limited to the key-value storage device and may be applied to an arbitrary object cache system or object storage system configured to manage data in units of objects. Accordingly, the storage device 100 may manage data in units of objects using an arbitrary method instead of key-value pairs.

The host 200 may transmit a command CMD (e.g., a write request or a put command) including a key-value (KEY, VALUE) to the storage device 100, and the storage device 100 may write a value VALUE to the non-volatile memory 120 in response to the command CMD. In an embodiment, the host 200 may transmit a command CMD (e.g., a read request or a get command) including a key KEY to the storage device 100, and the storage device 100 may read a value VALUE corresponding to the key KEY from the non-volatile memory 120 in response to the command CMD. The host 200 may not convert the key KEY into a logical block address (LBA) and/or physical address having a fixed size but may generate a command CMD including a key KEY having a variable size and transmit the generated command CMD to the storage device 100.

The controller 110 may control the non-volatile memory 120 to write the value VALUE to the non-volatile memory 120 in response to the write request from the host 200 or read the value VALUE stored in the non-volatile memory 120 in response to the read request from the host 200. In an embodiment, the controller 110 may include a mapping table (not shown), which may store mapping information between the key KEY and a physical address of the non-volatile memory 120.

In some embodiments, the controller 110 may generate a mapping index of the mapping table from the key KEY included in the command CMD, and the mapping table may store mapping information between the generated mapping index and the physical address of the non-volatile memory 120. In an embodiment, the mapping index may be a hashed key generated due to a hash operation on the key KEY, and the physical address may include a block address and a page address of the non-volatile memory 120, which may be used to access the value VALUE corresponding to the key KEY.

The non-volatile memory 120 may include a memory cell array MCA, which may include memory blocks BLK1 to BLKz. Also, each memory block (e.g., a first memory block BLK1) may include a plurality of pages PG1 to PGn. Here, each of z and n may be a positive integer and variously changed according to an embodiment. For instance, a memory block may be a unit of an erase operation, and a page may be a unit of write and read operations. When the storage device 100 receives a write or read command for the value VALUE, the controller 110 may write the value VALUE to the plurality of pages PG1 to PGn or read the value VALUE from the plurality of pages PG1 to PGn based on page-level mapping information. In addition, the storage device 100 may erase data on a block level due to an internal management operation (e.g., a garbage collection (GC) operation for generating free blocks). In some embodiments, when the storage device 100 receives a secure deletion command SecureDel(KEY, VALUE) according to an embodiment, the controller 110 may determine at least one block based on the mapping information of the key KEY and may erase data on the block level.

In some embodiments, the memory cell array MCA may include a plurality of planes, a plurality of dies, and/or a plurality of chips. In an embodiment, the non-volatile memory 120 may include a flash memory device, for example, a NAND flash memory device. However, the inventive concepts are not limited thereto, and the non-volatile memory 120 may include a resistive memory device, such as resistive RAM (ReRAM), phase-change RAM (PRAM), and magnetic RAM (MRAM).

The storage system 10 may be implemented as, for example, a personal computer (PC), a data server, a network-coupled storage, an Internet of Things (IoT) device, and/or a portable electronic device. The portable electronic device may be, for example, a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MPEG-1 audio layer 3 (MP3) player, a handheld game console, an electronic book (e-book), and/or a wearable device.

In some embodiments, the storage device 100 may be an internal memory embedded in an electronic device. For example, the storage device 100 may be a solid-state drive (SSD), an embedded universal flash storage (UFS) memory device, or an embedded multi-media card (eMMC). In some embodiments, the storage device 100 may be an external memory that is detachably attached to an electronic device. For instance, the storage device 100 may be a UFS memory card, a CompactFlash (CF), a secure digital (SD), a micro-secure digital (micro-SD), a mini-SD, an extreme digital (xD), or a memory stick.

According to an example embodiment, the storage device 100 having a key value interface may provide a secure deletion function, and the host 200 may provide a command for requesting secure deletion (e.g., the secure deletion command SecureDel(KEY, VALUE)) to the storage device 100. The host 200 may provide data along with the command for requesting secure deletion, such as the key KEY and/or the value VALUE. The storage device 100 may physically erase data stored in the non-volatile memory 120 in response to the secure deletion command SecureDel (KEY, VALUE). As a result, data may not be left in the non-volatile memory 120 to enhance data security, and the performance and lifespan of the storage system 10 may be improved in comparison to a block interface storage of the related art.

The storage device 100 (e.g., the key-value storage device), which serves as an object-based storage according to an embodiment, may perform a data management operation, such as a data generation operation, a data read operation, a date write operation, and a data deletion operation, based on given attributes and may enable optimization according to physical characteristics of the NAND flash memory device. In an example, as protection of personal data becomes significant, it may become important to maintain a record of quick deletion of data stored in the non-volatile memory 120 and access to the stored data. According to the embodiment, it may be possible to permanently delete the data stored in the non-volatile memory 120 using the secure deletion command SecureDel(KEY, VALUE). As a result, a security function may be enhanced so that important information requiring security may not remain in the non-volatile memory 120.

In an embodiment for the above-described operation, the controller 110 may include a secure deletion control module 111. The secure deletion control module 111 may be implemented as hardware and/or software. In some embodiments, the secure deletion control module 111 may be implemented as a combination of hardware and software. As an example, when the secure deletion control module 111 is implemented as software, the controller 110 may include at least one processor (not shown) configured to execute software and a memory (not shown) configured to store the software, and the secure deletion control module 111 may be loaded as a software module in the memory. According to an embodiment, the controller 110 may include a flash translation layer (FTL), and at least some of functions of the secure deletion control module 111 may be included in the FTL.

According to the above-described embodiments, the secure deletion control module 111 may perform a series of operations for controlling an erase operation corresponding to the secure deletion command SecureDel(KEY, VALUE). For example, data in the non-volatile memory 120 may be physically or permanently deleted via the control of the secure deletion control module 111.

According to an example embodiment, a value VALUE corresponding to any one key KEY may include one file (e.g., image or document), and the host 200 may provide a secure deletion request on a file level. In some embodiments, the host 200 may classify one file into at least two values, and a value VALUE corresponding to any one key KEY may include data corresponding to part of the file. In some embodiments, a value and a file will be described as the same concept for brevity. However, the embodiments are not limited thereto, and the value may be defined as various types of data. Also, the terms "value" and "file" may be used interchangeably herein with respect to embodiments of the inventive concepts.

The secure deletion control module 111 may control a series of operations for permanently deleting a file from the non-volatile memory 120 in response to the secure deletion command SecureDel(KEY, VALUE) from the host 200. According to an embodiment, the secure deletion control module 111 may perform an erase operation on a block level of the non-volatile memory 120 in response to the secure deletion command SecureDel(KEY, VALUE). When data of a file to be deleted is written to at least two blocks, the secure deletion control module 111 may control a series of operations for erasing the at least two blocks.

As an example of operation, the secure deletion control module 111 may refer to the mapping table and determine at least two blocks corresponding to the key KEY. When the erase operation is performed on the at least two blocks, the secure deletion control module 111 may sequentially output position information (e.g., the block address) indicating a block to be erased. That is, the secure deletion control module 111 may output block addresses indicating at least two blocks to be erased, in response to one secure deletion command SecureDel(KEY, VALUE) from the host 200. The controller 110 may sequentially or simultaneously perform an erase operation on a plurality of blocks, which are determined via the control of the secure deletion control module 111.

Although FIG. 1 illustrates an example in which the command CMD includes the key KEY and the value VALUE together, part of the command CMD may not include the value VALUE according to a characteristic and/or kind of a memory operation. As an example, the host 200 may provide a secure deletion command SecureDel (KEY), which includes the key KEY indicating a file desired to be securely deleted, to the storage device 100. In some embodiments, the key KEY may be data of a variable size. In some embodiments, the key KEY may not specify a logical and/or physical address of the file desired to be securely deleted.

Figure 2:
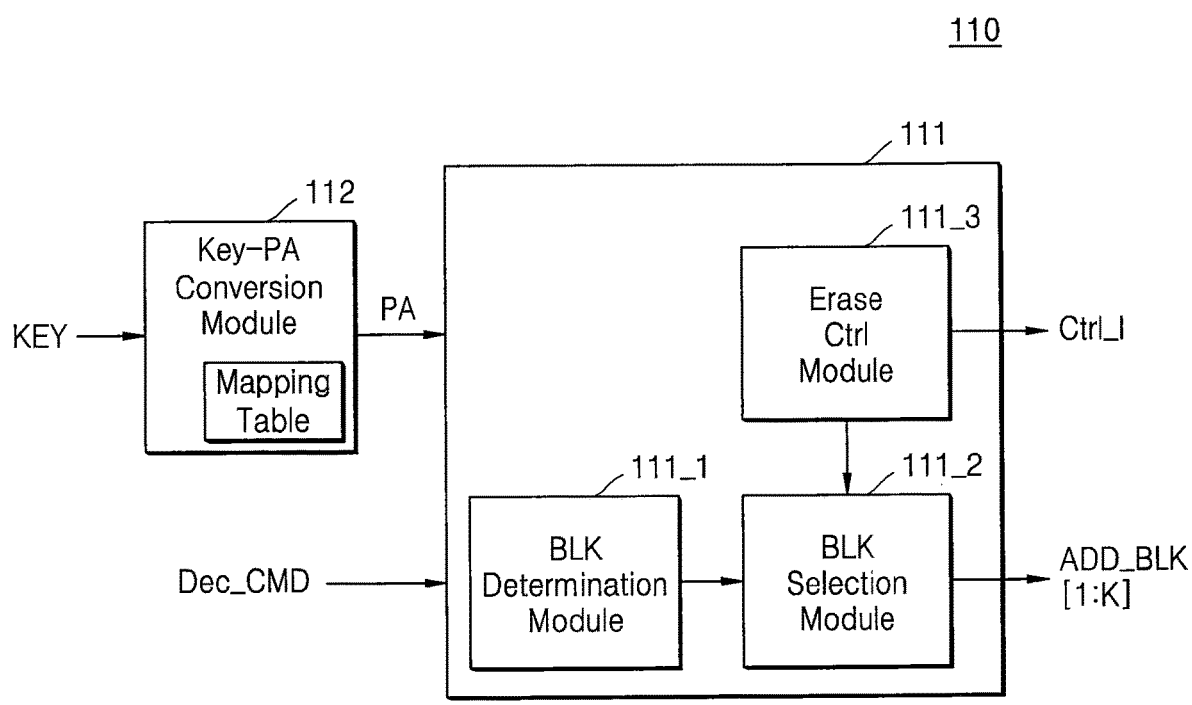
FIG. 2 is a block diagram of an embodied example of a controller of FIG. 1.

FIG. 2 is a block diagram of an embodied example of the controller 110 of FIG. 1.

Referring to FIGS. 1 and 2, the controller 110 may include a secure deletion control module 111 and a key-physical address (PA) conversion module 112. The secure deletion control module 111 may include a block determination module 111_1, a block selection module 111_2, and an erase control module 111_3. The key-PA conversion module 112 may perform an address conversion operation using a key KEY and generate mapping information between the key KEY and a physical address PA. The key-PA conversion module 112 may store the mapping information in a mapping table and output the physical address PA as mapping information on the key KEY that is provided by the host 200. In some embodiments, the controller 110 may perform a hash operation on the key KEY and generate a hashed key, and the key-PA conversion module 112 may store mapping information between the hashed key and the physical address PA.

Components of the secure deletion control module 111 shown in FIG. 2 may classify various operations related to a secure deletion operation according to functions, and a configuration of the secure deletion control module 111 according to an example embodiment is not limited to that shown in FIG. 2. As an example, an operation of determining a block to be erased, an operation of determining whether there is valid data in a block, an operation of determining a kind of the valid data in the block, an operation of copying the valid data to another block, and/or an operation of erasing the determined block may be sequentially performed. At least some of the above-described functions may be included in the secure deletion control module 111, and the remaining functions may be performed using other modules of the controller 110.

The block determination module 111_1 may determine at least one block in which the value VALUE requested to be securely deleted is stored. As an example, the block determination module 111_1 may receive the physical address PA corresponding to the key KEY from the key-PA conversion module 112 and determine a position of at least one block that is to be erased on a block level, based on the physical address PA.

When a block-level erase operation is sequentially performed, the block selection module 111_2 may output a block address ADD_BLK[1:k] for selecting a block to be erased. As an example, the value VALUE requested to be securely deleted may be stored in k blocks, and the block selection module 111_2 may output the block address ADD_BLK[1:k] based on the determination result from the block determination module 111_1.

Meanwhile, in response to an internal command Dec_CMD obtained by decoding the secure deletion command SecureDel(KEY, VALUE), the erase control module 111_3 may control an erase operation corresponding to the internal command Dec_CMD. As an example, the erase control module 111_3 may output an internal control signal Ctrl_I such that the controller 110 may output an internal command for requesting a block-level erase operation to the non-volatile memory 120. When the internal command for requesting the erase operation is provided to the non-volatile memory 120, the block determination module 111_1 may output a block address ADD_BLK[1:k] for indicating a block to be erased, via the control of the erase control module 111_3.

According to the above-described embodiment, the host 200 may provide one secure deletion command SecureDel (KEY, VALUE) so that file-level information may be permanently deleted from the non-volatile memory 120. Also, even when files are dispersed and stored in a plurality of blocks, an erase operation may be simultaneously or sequentially performed on the plurality of blocks in response to the single secure deletion command SecureDel(KEY, VALUE). Thus, a data deletion speed may be improved as compared with a case in which an operation of providing a block-level erase request by the host 200 and an operation of providing a response indicating completion of an erase operation on one block by the storage device 100 are repeated to delete one file.

Figure 3A:
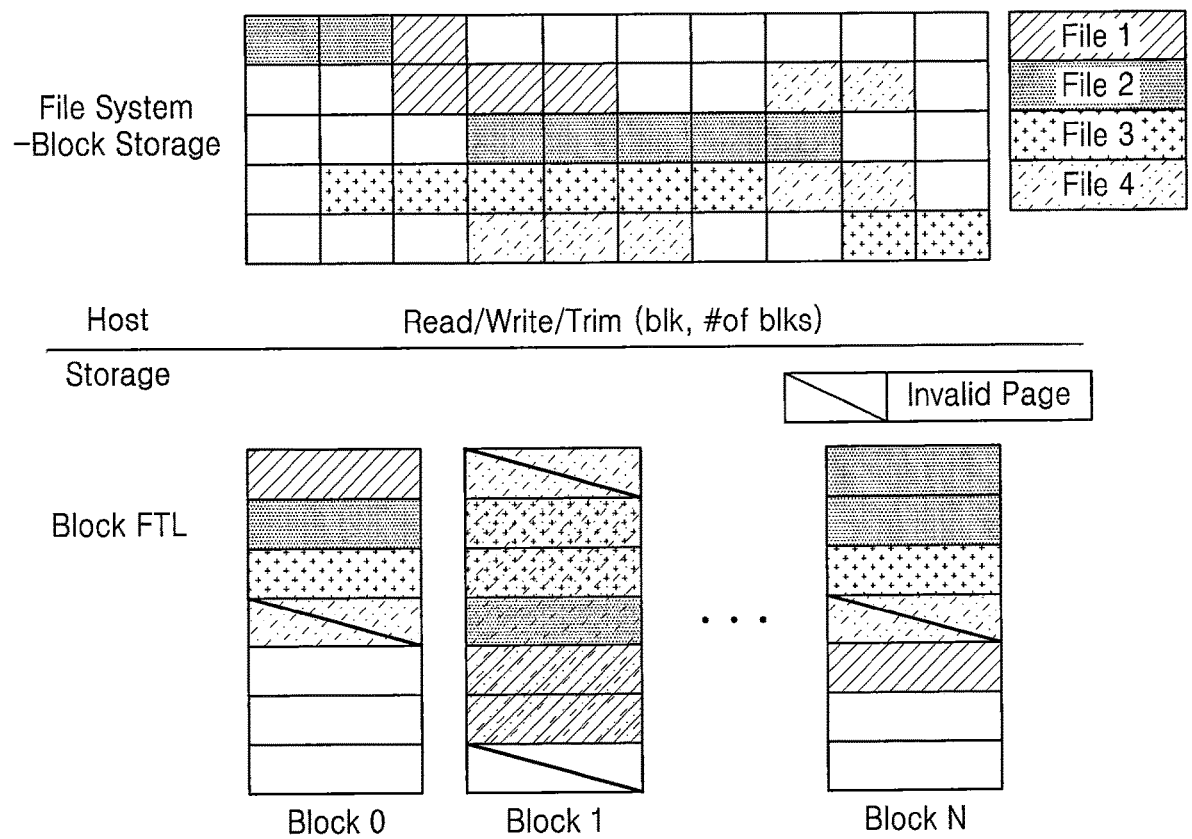
FIGS. 3A and 3B are conceptual diagrams illustrating an example of a comparison between data storage functions of a block storage system and a key-value storage system.
Figure 3B:
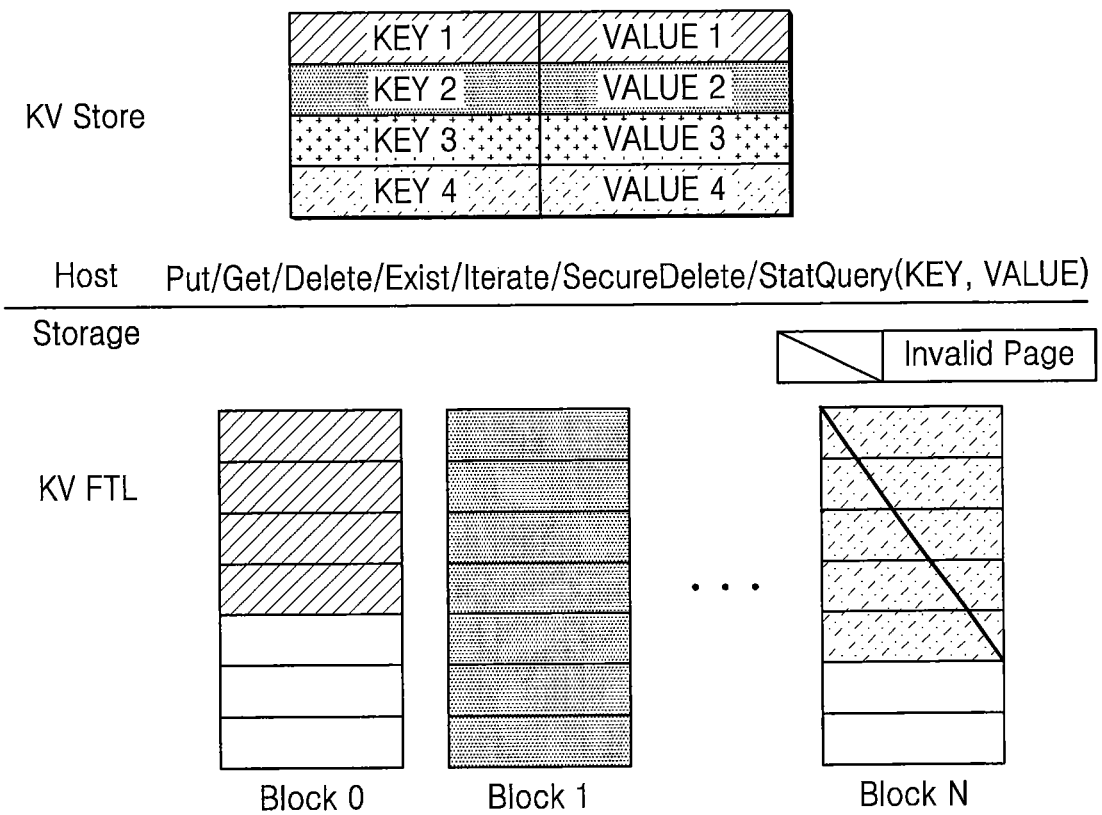

FIGS. 3A and 3B are conceptual diagrams illustrating an example of a comparison between data storage functions of a block storage system and a key-value storage system.

Referring to FIG. 3A, in a file-system-based block storage, a host may manage a logical address, and each of a plurality of files File 1 to File 4 may be managed by a plurality of logical addresses. In this case, data of each of the files File 1 to File 4 may be written to a plurality of blocks in a random manner and thus, the number of blocks configured to store data of one file may be increased.

In addition, a storage device may map a logical address from the host with a physical address and manage the storing of data. In this case, when data deletion is required in a block storage device of the related art, since data is logically erased due to a logical erase operation (e.g., deletion of mapping information), the data may be physically left in the storage device. To physically erase the data of the storage device, it may be determined whether data of each of the plurality of blocks is valid or invalid, and GC operations (e.g., an operation of copying valid data to other blocks) may be frequently performed to enable the erase operation. As a result, the performance and lifespan of the storage device may be reduced.

FIG. 3B illustrates an example in which data is stored in an object-based storage system, according to an embodiment of the inventive concepts.

A key-value storage device according to an embodiment may provide a secure deletion function and store data based on a key-value protocol. As an example, to store data, since the key-value storage device determines data (e.g., values) corresponding to the same key as the same attribute, the key-value storage device may relatively or maximally sequentially manage the data in at least one same or adjacent block. That is, the key-value storage device may have an advantage of immediately reading data (or a value) related to a key and storing the data related to the key in one block or a reduced number of blocks.

Thus, according to an example embodiment, a storage device based on a key-value interface having a key-value with a variable size may provide a secure deletion function on a predetermined level (e.g., a key or value level), and a value corresponding to a key may be stored in a relatively small number of blocks. Accordingly, the number of times a GC operation is performed may be minimized and/or reduced during a secure deletion operation on data corresponding to the key. Therefore, during the secure deletion operation, it may be easier to manage the performance and lifespan of the storage device based on the key-value interface than those of a block-based storage device. In some cases, even if the value is stored in at least two blocks, the number of blocks in which the value is stored may be smaller than in a block-based storage device of the related art. Since only data in the same block is, erased or only data in a reduced number of blocks is erased during the secure deletion operation, an overhead O/H for a merge operation may be minimized and/or reduced.

Figure 4A:
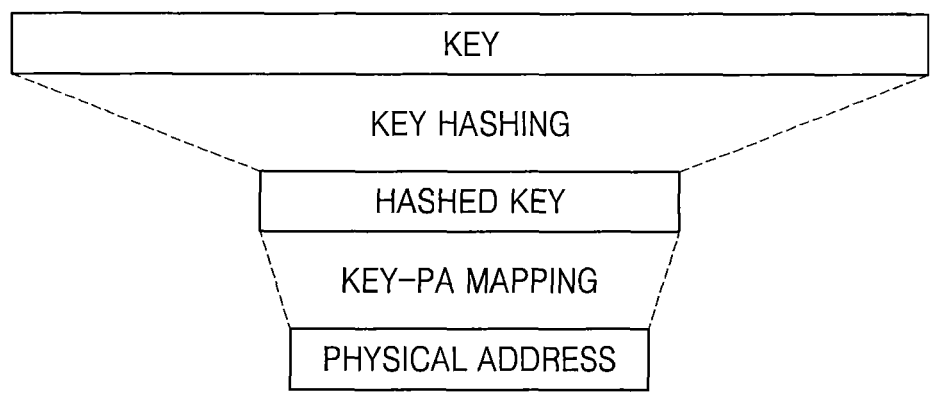
FIGS. 4A and 4B are diagrams illustrating an address conversion operation and information stored in a non-volatile memory according to an example embodiment of the inventive concepts.
Figure 4B:
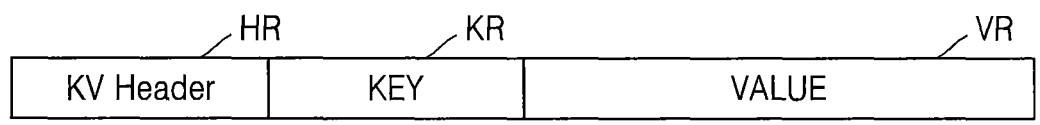

FIGS. 4A and 4B are diagrams illustrating an address conversion operation and information stored in a non-volatile memory according to an example embodiment of the inventive concepts.

Referring to FIGS. 1 and 4A, the host 200 may provide a key KEY to the storage device 100 to perform write and/or read operations on a file, and the storage device 100 may perform a hash operation on the key KEY and generate a hashed key.

Furthermore, mapping information obtained by converting the hashed key into a physical address PA may be stored in a mapping table. As an example, the hash key generated due to the hash operation may be used as a mapping index (i.e., a hash index), and the physical address PA may be stored according to each mapping index. As described above, the physical address PA may include a block address and a page address for storing a value VALUE in the non-volatile memory 120.

Referring to FIG. 4B, key-value header information may be stored along with a key-value in the non-volatile memory 120. As an example, the non-volatile memory 120 may include a first region HR in which the key-value header information is stored, a second region KR in which the key KEY is stored, and a third region VR in which the value VALUE is stored. Since the key KEY provided by the host 200 has a large variable size, the key KEY from the host 200 may not be stored in a memory (e.g., dynamic random access memory (DRAM)) included in the controller 110 but stored along with the value VALUE in the non-volatile memory 120. Meanwhile, the key-value header information may include metadata related to the key-value corresponding thereto. For example, the key-value header information may include information related to sizes of the key KEY and the value VALUE. The storage device 100 may divide the key KEY from the value VALUE using the key-value header information.

FIG. 5 illustrates a table showing an example of mapping information between keys and physical addresses. Although a key KEY is illustrated as the mapping information by example in FIG. 5, as described above, a hash operation may be performed on the key KEY, and mapping information between hashed keys and physical addresses corresponding thereto may be stored in a mapping table.

Furthermore, FIG. 5 illustrates an example in which any one key KEY is mapped with physical addresses of a plurality of pages. However, the table shown in FIG. 5 conceptually illustrates a plurality of positions in which a value corresponding to the key KEY is stored, and actual mapping information is not limited to a construction shown in FIG. 5. As an example, a plurality of page-level mapping indices may be generated using the key KEY, and mapping information between one page-level mapping index and one physical address may be stored in the mapping table.

Referring to FIG. 5, a first value corresponding to a first key KEY 1 may be stored in a non-volatile memory. As an example, the first value corresponding to the first key KEY 1 may be stored in a first block BLK1 and a second block BLK2. FIG. 5 illustrates an example in which the first value is stored in A pages of the first block BLK1 and B pages of the second block BLK2. Meanwhile, a second value corresponding to a second key KEY 2 may be stored in the non-volatile memory. As an example, the second value may be stored in C pages of one block, namely, a third block BLK3.

A storage device may delete data on a file level in response to a request from a host. When a secure deletion command including the first key KEY 1 is received, the storage device may perform an erase operation on the first block BLK1 and the second block BLK2. When valid data (not shown) related to different files are respectively stored in the first block BLK1 and the second block BLK2, the storage device may copy the valid data of the first block BLK1 and the second block BLK2 to another block. After the copy operation is completed, the storage device may perform an erase operation on the first block BLK1 and the second block BLK2.

As an example of operation, the storage device may sequentially perform a copy operation on the valid data and an erase operation on the first block BLK1 and the second block BLK2 in response to one secure deletion command from the host. For example, by referring the mapping table using the first key KEY 1, the block BLK1 and the second block BLK2 may be determined to be at least one block to be erased, and positions of the valid data stored in the first block BLK1 and the second block BLK2 may be determined. As an example of operation, after the valid data of the first block BLK1 is copied to another block and the first block BLK1 is erased, the valid data of the second block BLK2 may be copied to another block and the second block BLK2 may be erased. In some embodiments, after the valid data of the first block BLK1 and the second block BLK2 is copied to another block, the first block BLK1 and the second block BLK2 may be sequentially or simultaneously erased.

Meanwhile, a second file may be erased in response to a second deletion command including the second key KEY 2 from the host. Since the second file is stored in one block (i.e., the third block BLK3), the one block may be erased to complete an operation in response to the secure deletion command. For example, when valid data of another file is stored in the third block BLK3, the valid data of the third block BLK3 may be copied to another block and then the third block BLK3 may be erased.

Figure 6:
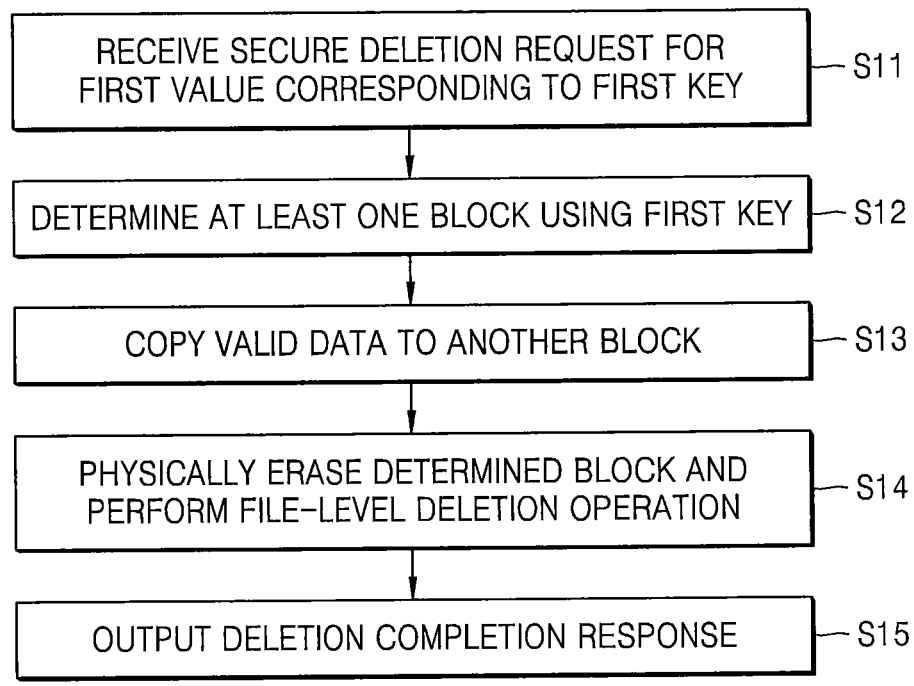
FIG. 6 is a flowchart of a method of operating a storage device according to an example embodiment of the inventive concepts.

FIG. 6 is a flowchart of a method of operating a storage device according to an example embodiment of the inventive concepts.

Referring to FIG. 6, according to a method of writing data based on a key-value protocol, data (e.g., a first value corresponding to a first key) of any one file may be stored in at least one block of the storage device. As an example, data of the first value may not be written at random to a plurality of blocks. The data of the first value may be written to a plurality of pages of one block and then written to another block. Due to the above-described write operation, mapping information between the first key and a physical address may be stored in a mapping table. Thereafter, the storage device may receive a secure deletion request for the first value corresponding to the first key from the host (operation S11).

The storage device may refer to the mapping table using the first key from the host and determine the number and positions of blocks to be erased (operation S12). Also, by referring to the mapping table, the storage device may determine whether valid data related to other files is stored in the blocks to be erased.

Based on the determination results, the storage device may perform an operation of copying valid data from the determined blocks (e.g., the blocks to be erased) to another block (operation S13). In some embodiments, the valid data to be copied from the determined blocks may include data in the determined blocks that does not correspond to the first key. After the copy operation is completed, the storage device may perform a physical erase operation on the determined blocks (operation S14). As an example, when at least two blocks are determined to be the blocks to be erased, the storage device may sequentially or simultaneously perform an erase operation on the at least two determined blocks and perform a deletion operation on a file level. After the erase operation on the at least two blocks is completed, the storage device may provide a deletion completion response to the host in response to a command from the host (operation S15).

Figure 7:
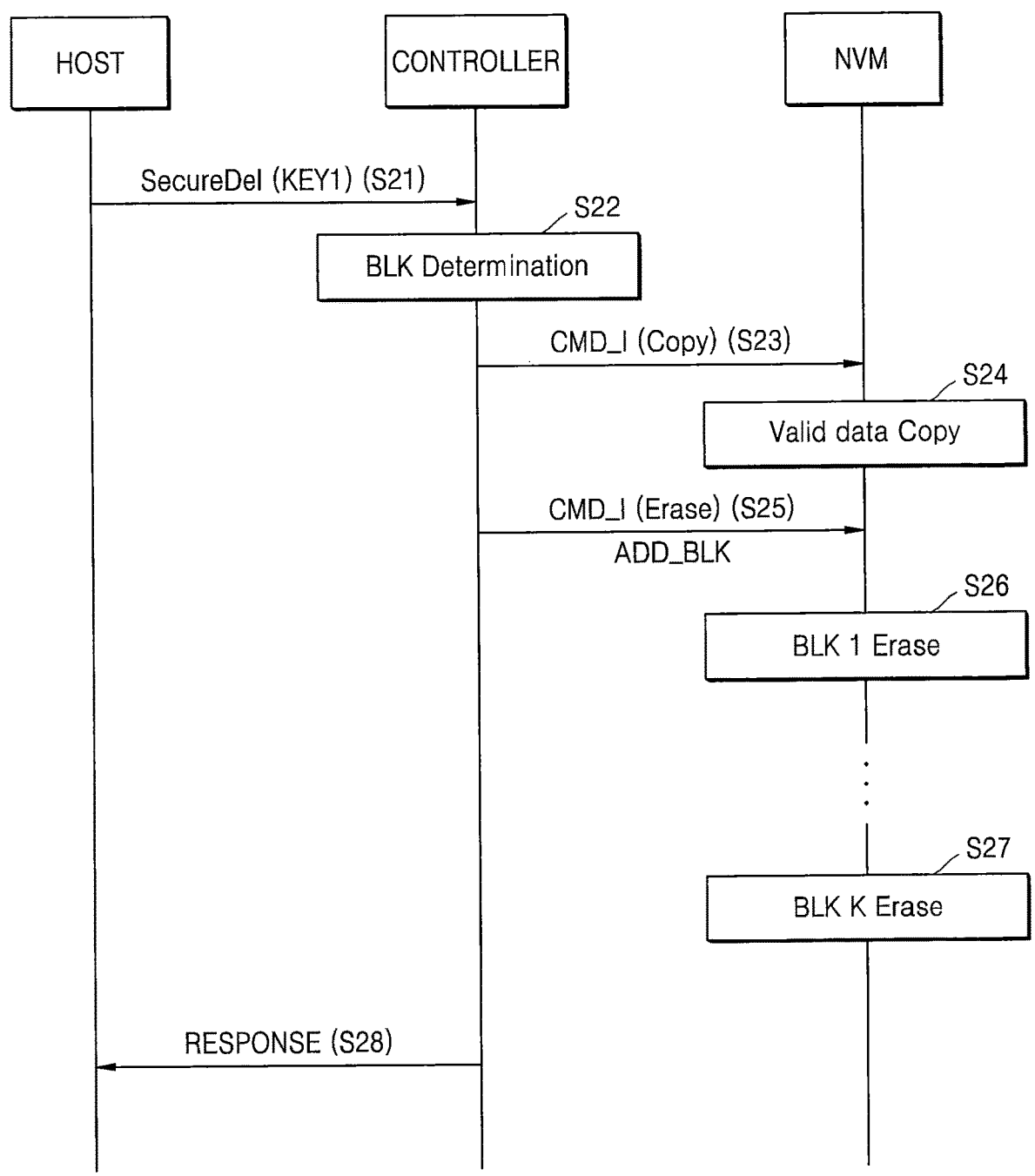
FIG. 7 is a schematic conceptual diagram of a secure erase operation based on the flowchart of FIG. 6.

FIG. 7 is a schematic conceptual diagram of a secure erase operation based on the flowchart of FIG. 6.

Referring to FIG. 7, to erase a value corresponding to a first key KEY1, a host HOST (e.g., host 200 of FIG. 2) may provide a secure deletion command SecureDel including the first key KEY1 to a storage device (operation S21), and a controller CONTROLLER (e.g., controller 110 of FIG. 2) of the storage device may sequentially perform various operations related to a secure erase operation in response to the secure deletion command SecureDel. According to the above-described embodiments, the controller CONTROLLER may determine a block to be erased by referring to a mapping table using the first key KEY1 (operation S22), and provide an internal command CMD_I(Copy) to a non-volatile memory NVM (e.g., non-volatile memory 120 of FIG. 2) to perform a copy operation on valid data of the determined block (operation S23). The non-volatile memory NVM may copy the valid data of the determined block to another block (operation S24). As an example, when a plurality of blocks determined to be erased are first to K-th blocks BLK 1 to BLK K, the controller CONTROLLER may provide a physical address indicating a position of valid data and a physical address indicating a position to be copied to the non-volatile memory NVM, and the non-volatile memory NVM may copy valid data from the first to K-th blocks BLK 1 to BLK K to another block.

After the copy operation on the valid data is completed, the controller CONTROLLER may provide an internal command CMD_I(Erase) and a block address ADD_BLK to the non-volatile memory NVM to perform an erase operation on the blocks associated with the block address ADD_BLK (operation S25). For example, the internal command CMD_I(erase) may result in an erase operation on the first to K-th blocks BLK 1 to BLK K. The non-volatile memory NVM may perform the erase operation on the first to K-th blocks BLK 1 to BLK K in response to the internal command CMD_I(Erase) (operations S26 and S27). After the erase operation is completed, the controller CONTROLLER may provide a deletion completion response RESPONSE to the host (operation S28).

Hereinafter, a storage device according to various embodiments, which are applicable to the inventive concepts, will be described.

Figure 8A:
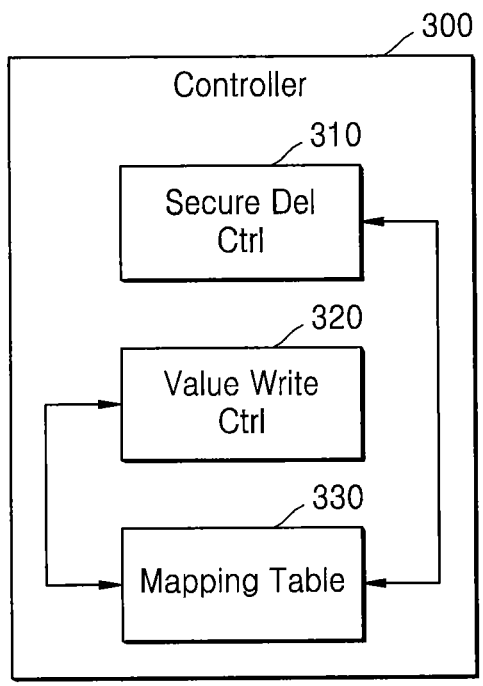
FIGS. 8A, 8B, and 9 are diagrams illustrating a secure deletion operation when one block selectively stores one file.
Figure 8B:
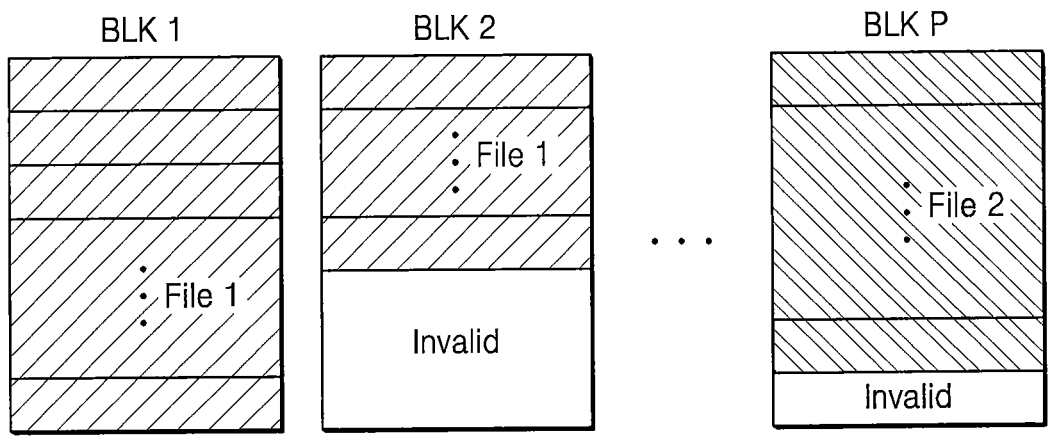
Figure 9:
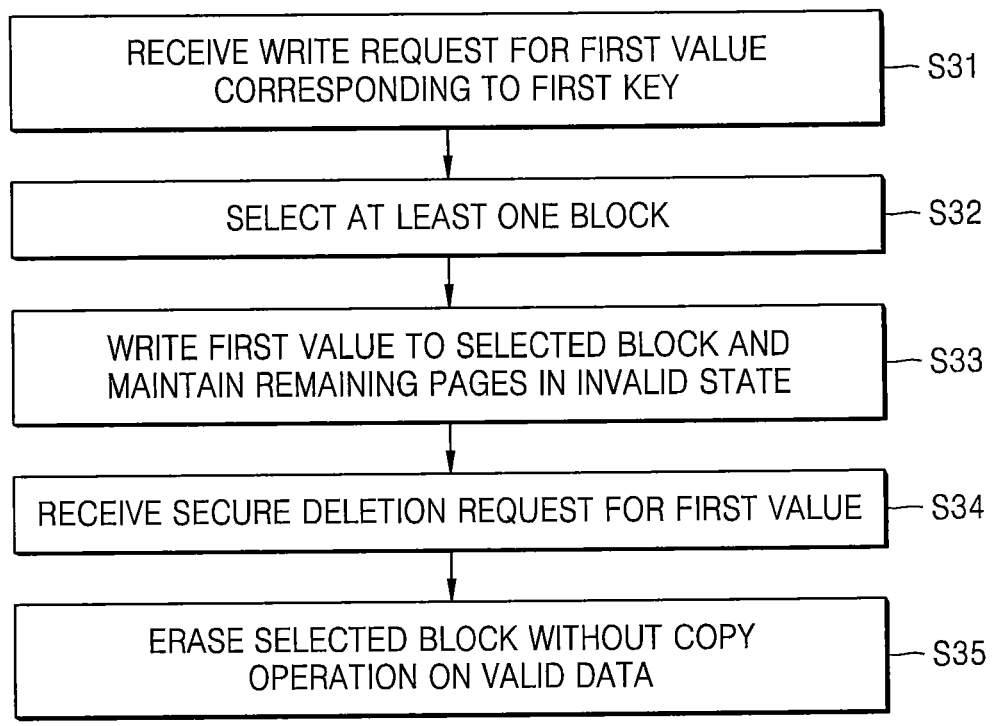

FIGS. 8A, 8B, and 9 are diagrams illustrating a secure deletion operation when one block selectively stores one file.

Referring to FIG. 8A, a controller 300 included in a storage device may include a secure deletion control module 310, a value write control module 320, and a mapping table 330. As in the above-described embodiment, each of the secure deletion control module 310 and the value write control module 320 may be implemented as a hardware configuration and/or may include programs executable by a processor and be implemented as software. In some embodiments, as described above, each of the secure deletion control module 310 and the value write control module 320 may be implemented as a combination of hardware and software.

According to the above-described embodiments, the secure deletion control module 310 may control a series of operations for erasing at least one block in response to a secure deletion command from a host. When a write request for a value is received from the host, the value write control module 320 may map a key with a physical address indicating pages of the at least one block due to an address conversion operation using the key transmitted from the host, and write the value to a region indicated by the mapped physical address. In some embodiments, the address conversion operation using the key may be controlled such that one block selectively stores one file.

As an example, referring to FIG. 8B, when a write operation on a value corresponding to the first file File 1 is requested, a size of the value may exceed a size of one block. Part of data of the first file File 1 may be written to one block, and the remaining data of the first file File 1 may be then written to another block. FIG. 8B illustrates an example in which part of the data of the first file File 1 is written to the first block BLK 1 and the remaining data of the first file File 1 is written to the second block BLK 2. Also, FIG. 8B illustrates an example in which since a size of a value corresponding to the second file File 2 is smaller than the size of the one block, data of the second file File 2 is stored in a partial region of a P-th block BLK P.

When the data of the first file File 1 is written to a partial region of the second block BLK 2 via the control of the value write control module 320, data of another file may not be written to the remaining region of the second block BLK 2 so that the remaining region of the second block BLK2 may be maintained in an invalid state. Also, the data of the second file File 2 may be written to the partial region of the P-th block BLK P, and data of another file may be written to the remaining region of the P-th block BLK P so that the remaining region of the P-th block BLK P may be maintained in an invalid state. Mapping information between the key and the physical address due to the above-described write operations may be stored in the mapping table 330.

Thereafter, secure deletion of the first file File 1 and the second file File 2 may be requested in response to a command from the host, the storage device may perform a secure deletion operation in response to the request. For example, when the secure deletion of the first file File 1 is requested, according to the above-described embodiments, the storage device may sequentially perform an erase operation on the first block BLK 1 and the second block BLK 2 in which data of the first file File 1 is stored. In addition, since valid data of another file is not stored in the first block BLK 1 and the second block BLK 2, the deletion operation may be completed without performing a copy operation on the valid data.

FIG. 9 is a flowchart of a method of operating the storage device shown in FIGS. 8A and 8B, according to an embodiment of the inventive concepts.

Referring to FIG. 9, when a write request for a first key and a first value corresponding to the first key is received from the host (operation S31), the storage device may perform an address conversion operation using the first key to generate a physical address, and select at least one block based on the generated physical address (operation S32). Also, the storage device may write data of a file corresponding to the first value requested to be written, to selected blocks, and pages of the selected blocks to which the data is not written may be maintained in an invalid state without writing data of another file thereto (operation S33).

Thereafter, the storage device may receive a secure deletion request for the first value from the host (operation S34). The storage device may perform an erase operation on at least one block in which the first value is stored, according to the above-described embodiments, and a deletion operation may be completed without performing a copy operation on valid data (operation S35).

Figure 10:
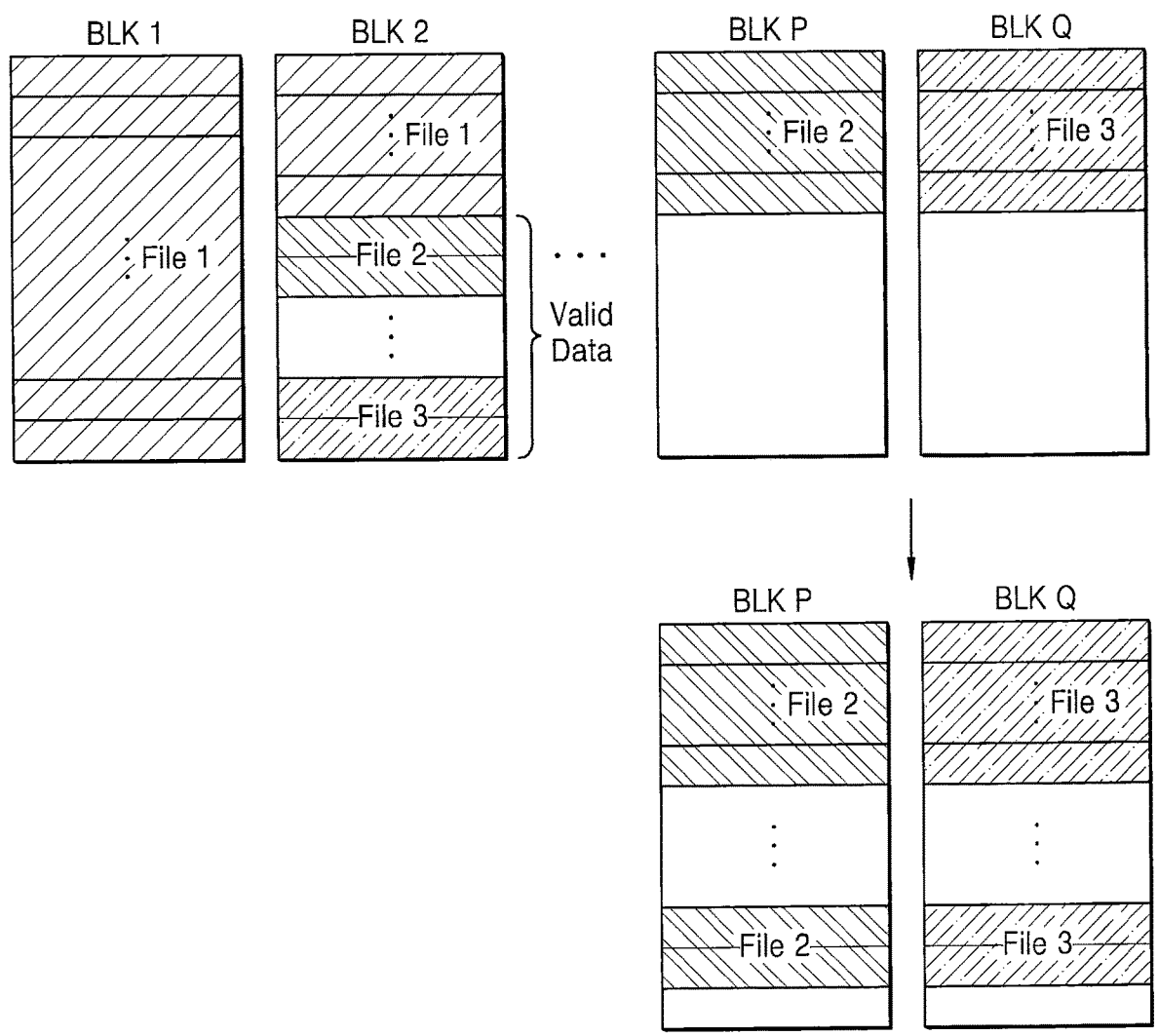
FIG. 10 is a conceptual diagram of an operation of copying valid data in a secure deletion operation according to an embodiment of the inventive concepts.

FIG. 10 is a conceptual diagram of an operation of copying valid data in a secure deletion operation according to an embodiment of the inventive concepts. FIG. 10 illustrates an example in which since data of at least two files is written to one block, an operation of copying valid data occurs in a secure deletion operation.

Referring to FIG. 10, data of a first file File 1 may be written to a first block BLK 1 and a second block BLK 2, and data of a second file File 2 and a third file File 3 may be written to a partial region of the second block BLK 2. In this case, secure deletion of the first file File 1 may be requested, so an erase operation on the first block BLK 1 and the second block BLK 2 may be performed. In this case, it may be necessary to copy valid data of the second file File 2 and the third file File 3 stored in the second block BLK 2 to another block.

A storage device may determine the first block BLK1 and the second block BLK2 are to be erased (e.g., in response to a secure deletion command), using mapping information stored in a mapping table, and may determine valid data stored in the second block BLK 2. Also, the storage device may determine a block (e.g., a P-th block BLK P) in which another data of the second file File 2 is stored and a block (e.g., a Q-th block BLK Q) in which another data of the third file File 3 is stored, using the mapping information.

To copy the valid data during the secure deletion operation, the storage device may determine a block that stores data of the same file as valid data, and copy the valid data to the determined block. As an example, the valid data of the second file File 2 stored in the second block BLK 2 may be copied to the P-th block BLK P in which another data of the second file File 2 is stored. Also, the valid data of the third file File 3 stored in the second block BLK 2 may be copied to the Q-th block BLK Q in which the another data of the third file File 3 is stored. Due to the above-described copy operation on the valid data, when a secure deletion request for the second file File 2 and the third file File 3 is subsequently received, a copy operation on valid data may be reduced and/or minimized, and the number of blocks on which an erase operation is performed may be reduced.

Figure 11:
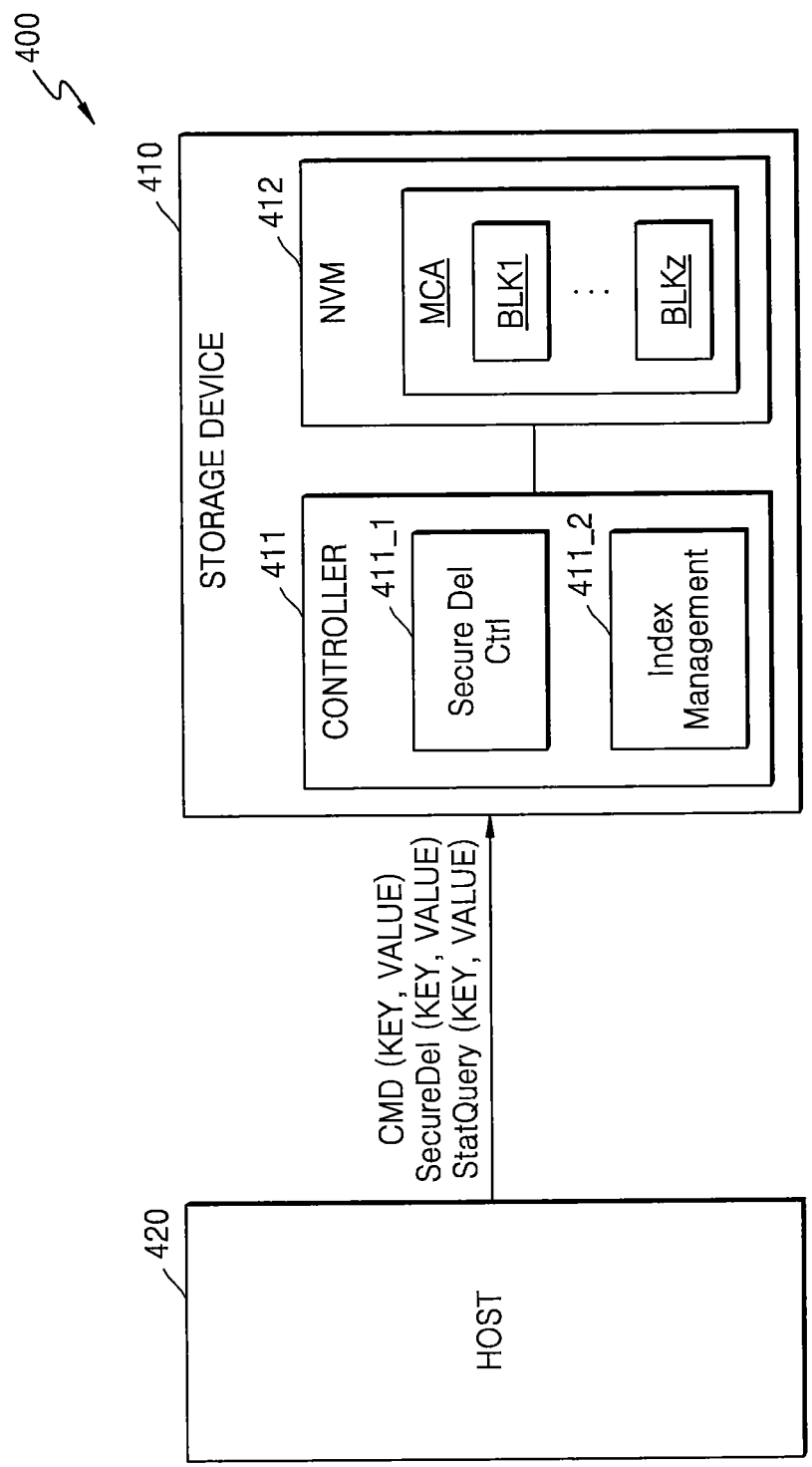
FIG. 11 is a block diagram of a storage system according to an embodiment of the inventive concepts.

FIG. 11 is a block diagram of a storage system 400 according to an embodiment of the inventive concepts.

Referring to FIG. 11, the storage system 400 may include a storage device 410 and a host 420, and the storage device 410 may include a controller 411 and a non-volatile memory 412. The storage device 410 may be a key-value storage device and/or a key-value store, and the host 420 may provide a command CMD including a key-value (KEY, VALUE) to the storage device 410. In the description of components and examples of operations of the storage device 410 shown in FIG. 11, a detailed description of the same components of the storage devices (e.g., storage device 100 of FIG. 1) as in the above-described embodiments will be omitted. For example, portions of controller 411 may operate substantially similarly as controller 110 of FIG. 1 and/or controller 300 of FIG. 8A.

The controller 411 may include a secure deletion control module 411_1 and an index management module 411_2. According to the above-described embodiments, the secure deletion control module 411_1 may control a series of operations for deleting value-level (or file-level) data in response to a secure deletion request from the host 420. As an example, the secure deletion control module 411_1 may perform an erase operation on at least two blocks in response to a single secure deletion command SecureDel(KEY, VALUE). In addition, according to the above-described embodiments, when only one file is selectively stored in one block, a deletion operation may be completed without performing a copy operation on valid data.

Meanwhile, the storage device 410 may store and manage various pieces of information related to data stored in the non-volatile memory 412 or state information (e.g., index information), such as a change history. Thus, a record of access to data stored in the non-volatile memory 412 may be retained. Furthermore, a state request command StatQuery (KEY, VALUE) for confirming a usage history of desired data (e.g., user's personal information) may be defined to optimize data security and efficient management of the storage device 410. In some embodiments, the key KEY may be data of a variable size. In some embodiments, the key KEY may not specify a logical and/or physical address of the data for which state information is desired.

In an embodiment for the above-described operation, the controller 411 may include the index management module 411_2, which may be implemented as hardware and/or software. In some embodiments, the index management module 411_2 may be implemented as a combination of hardware and software. As an example, when the index management module 411_2 is implemented as software, the controller 411 may include at least one processor (not shown) configured to execute software and a memory (not shown) configured to store the software, and the index management module 411_2 may be loaded as a software module in the memory. According to an embodiment, the controller 411 may include an FTL, and the index management module 411_2 may be included in the FTL.

The index management module 411_2 may manage various kinds of pieces of state information about data stored in the non-volatile memory 412 as index information. For example, when data is newly written to the non-volatile memory 412, the index management module 411_2 may manage a data write time as the index information. In some embodiments, the index information may include various pieces of information (e.g., an access count of data stored in the non-volatile memory 412 and a change history and change count of the data). The index management module 411_2 may store the index information in the non-volatile memory 412. Also, the index management module 4112 may provide the index information to the host 420 in response to the state request command StatQuery(KEY, VALUE) from the host 420.

Figure 12:
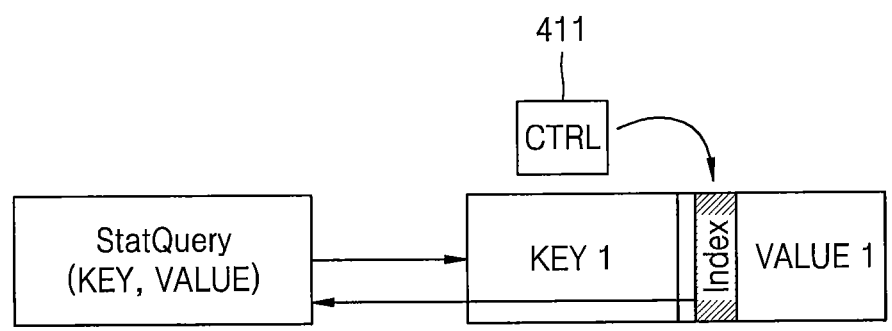
FIGS. 12 and 13 are block diagrams of an example of a data management operation according to an example embodiment of the inventive concepts.
Figure 13:
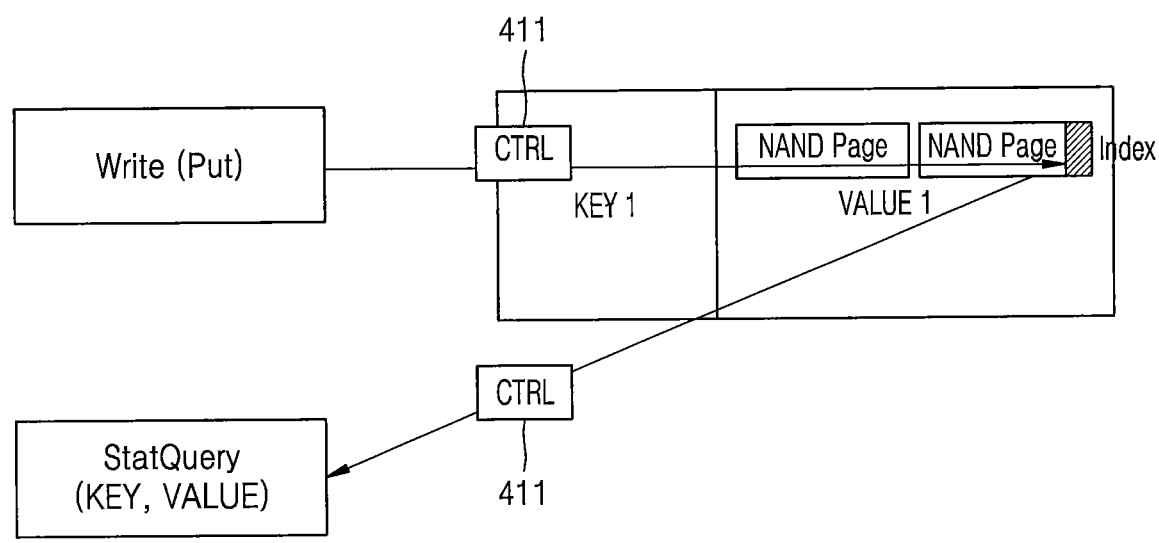

A specific example related to an index management operation will now be described. FIGS. 12 and 13 are block diagrams of an example of a data management operation according to an example embodiment of the inventive concepts.

Referring to FIGS. 11 and 12, the storage device 410 may receive a state request command StatQuery(KEY, VALUE) from the host 420 and provide index information Index, which is stored therein, to the host 420 in response to the state request command StatQuery(KEY, VALUE). The storage device 410 may include the controller 411 (illustrated as controller CTRL in FIG. 12) according to the above-described embodiment, and store a key and a value corresponding to the key in the non-volatile memory 412 via the control of the controller 411. FIG. 12 illustrates an example of a first key KEY 1 and a first value VALUE 1 corresponding to the first key KEY 1. The index information Index of FIG. 12 may include various kinds of pieces of state information related to the first value VALUE 1 corresponding to the first key KEY 1.

The controller 411 may control an operation of storing the various kinds of pieces of state information related to the first value VALUE 1 as the index information Index in the non-volatile memory 412 and updating the index information Index. Also, when the state request command StatQuery (KEY, VALUE)) for the first key KEY 1 is provided by the host 420, the controller 411 may read the index information Index related to the first value VALUE 1 and provide the index information Index to the host 420.

According to an embodiment, the controller 411 may store and manage various pieces of state information as the index information Index. For instance, when a write command for the first value VALUE 1 is provided, the index information Index may include information (e.g., an age of data) related to a write time of the first value VALUE 1. The write time may be determined using various methods. As an example, the host 420 may provide time information to the storage device 410, and the storage device 410 may calculate a write time based on a time stamp in a write time point of the first value VALUE 1 using an internal clock counter. Also, the index information Index may include information related to an access count of the first value VALUE 1. As an example, the first value VALUE 1 may be referred to in response to various commands (e.g., Get(KEY, VALUE) and Iterate(KEY, VALUE)), and the number of times the first value VALUE 1 is referred to may be updated. An access count (or a read count) may be set to 0 in a time point in which the first value VALUE 1 is written. The read count may be increased in response to the above-described commands (e.g., Get(KEY, VALUE) and Iterate(KEY, VALUE)).

The above-described index information Index may be stored and managed according to each key KEY. When the state request command StatQuery(KEY, VALUE) is provided from the host 420, the index information Index corresponding to the key KEY may be provided to the host 420.

Furthermore, when the first value VALUE 1 corresponding to the first key KEY 1 is partially changed, a change history of the first value VALUE 1 may be managed as the index information Index. For example, the first value VALUE 1 may be changed a plurality of times, and a history of the plurality of changes of the first value VALUE 1 may be managed as the index information Index. The index information Index may include changed contents of the first value VALUE 1 and include information, such as a change count of the first value VALUE 1.

Referring to FIG. 13, when a write command Write(Put) is provided from the host 420, the controller 411 may write the first value VALUE 1 corresponding to the first key KEY 1 to a plurality of pages of the non-volatile memory 412, generate index information Index related to the first value VALUE 1, and store the index information Index along with the first key KEY 1 and the first value VALUE 1 in the non-volatile memory 412. Thereafter, when a state request command StatQuery(KEY, VALUE) is provided by the host 420, the controller 411 may confirm a position in which the first value VALUE 1 corresponding to the first key KEY 1 is stored, read index information Index corresponding to the first value VALUE 1, and provide the index information Index to the host 420. Though FIG. 13 illustrates two representations of controller 411 for ease of illustration, it will be understood that the two representations indicate a same controller 411 operating at different times.

Figure 14:
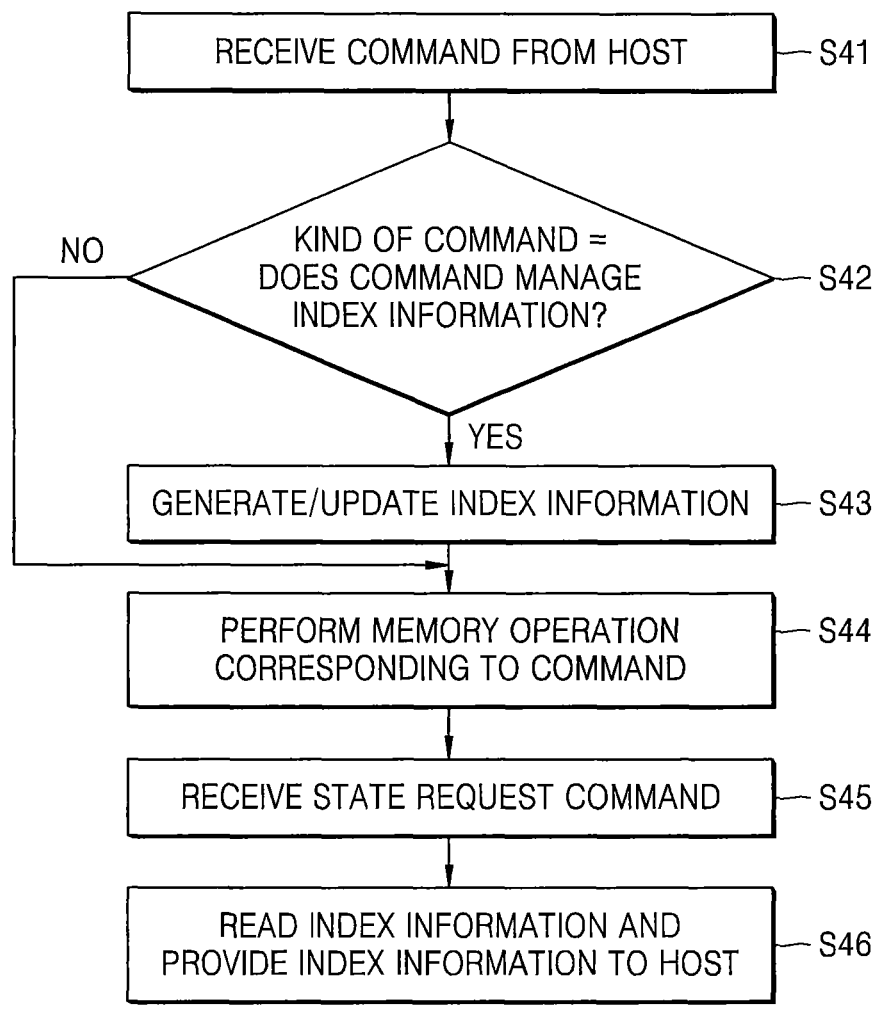
FIG. 14 is a flowchart of a method of operating a storage device according to an example embodiment of the inventive concepts.

FIG. 14 is a flowchart of a method of operating a storage device according to an embodiment of the inventive concepts.

Referring to FIG. 14, the storage device may communicate with a host and receive requests for various memory operations (operation S41). Thus, the storage device may receive various kinds of commands indicating requests from the host. As an example, some of the various kinds of commands may correspond to commands that need to manage the above-described index information, and some other commands may correspond to commands that do not manage the index information. The storage device may determine a kind of command from the host and determine whether a received command corresponds to a command that manages the index information (operation S42).

As an example, when the command from the host corresponds to a command (e.g., a data write command, a data change command, or a data write command) that needs the management of the index information, the storage device may generate or update the index information in response to the command from the host (operation S43). Also, the storage device may perform a memory operation corresponding to the command from the host along with an operation of managing the index information (operation S44).

Thereafter, the host may provide a state request command to the storage device to determine a state of files, and the storage device may receive the state request command (operation S45). The storage device may read index information of a value corresponding to a key from the host and provide the index information to the host (operation S46).

Meanwhile, although the above-described embodiment pertains to a case in which the storage device generates the index information and changes the index information due to an update operation, embodiments of the inventive concepts are not limited thereto. As an example, the host may generate various kinds of pieces of index information (e.g., read count information and/or time stamp information) and provide the generated index information to the storage device. Also, the host may receive the index information from the storage device, generate updated index information, and provide the updated index information to the storage device.

Figure 15:
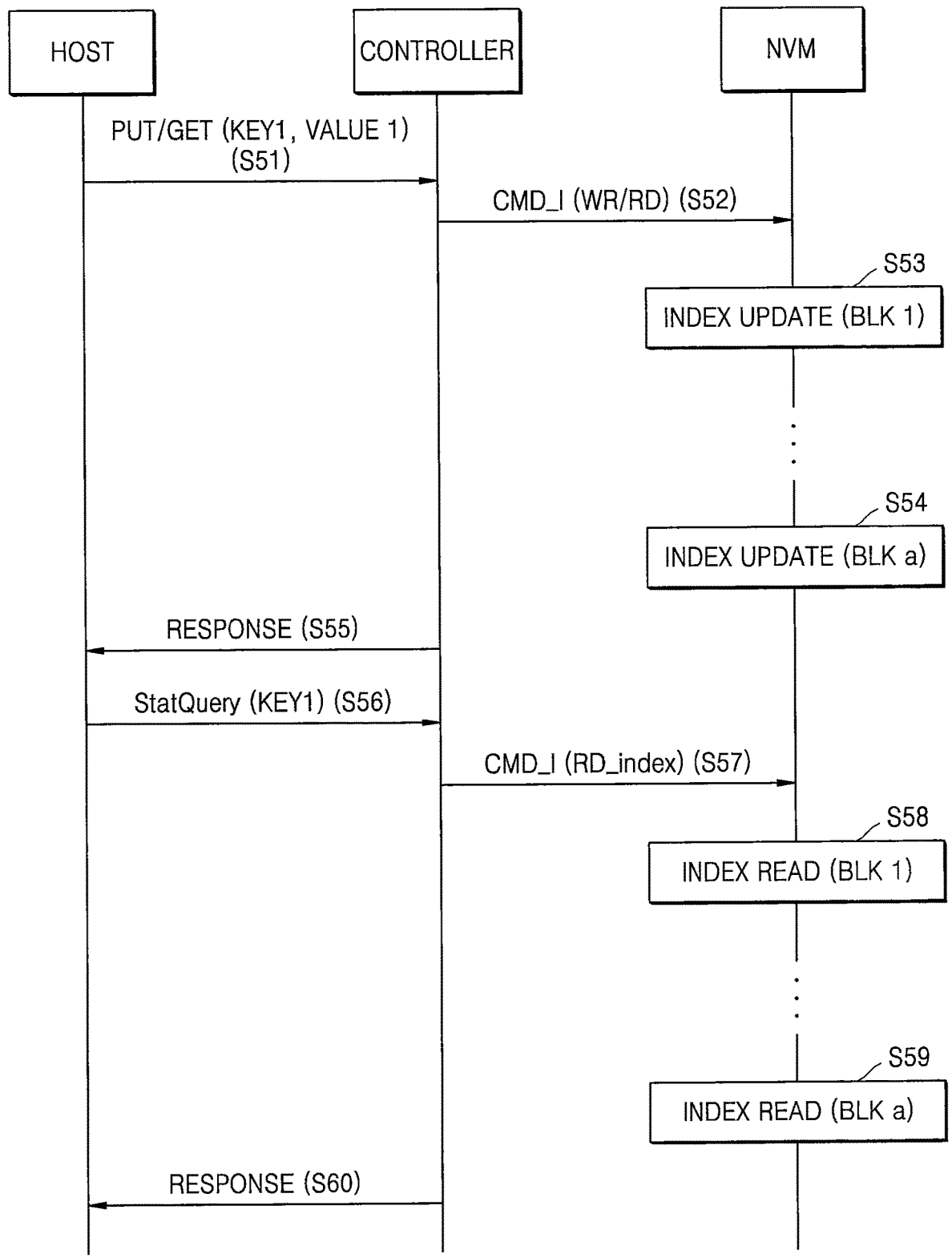
FIG. 15 is a schematic conceptual diagram of an example of an operation of managing index information according to an embodiment of the inventive concepts.

FIG. 15 is a schematic conceptual diagram of an example of an operation of managing index information according to an embodiment of the inventive concepts.

Referring to FIG. 15, a host HOST (e.g., host 420 of FIG. 11) may provide a write/read command PUT/GET CMD to a storage device to write/read a first value VALUE 1 corresponding to a first key KEY 1 (operation S51), and a controller CONTROLLER (e.g., controller 411 of FIG. 11) may provide an internal command CMD_I(WR/RD) to a non-volatile memory NVM (e.g., non-volatile memory 412 of FIG. 11) to write/read the first value VALUE 1 (operation S52). The first value VALUE 1 may be written to first to a-th blocks BLK 1 to BLK a, which may be at least one block of the non-volatile memory NVM, or read from the first to a-th blocks BLK 1 to BLK a. The non-volatile memory NVM may store index information INDEX in the first to a-th blocks BLK 1 to BLK a and/or update the index information INDEX (operations S53 and S54). Also, the controller may provide a completion response RESPONSE to the host HOST when the write/read operation on the first value VALUE 1 is completed (operation S55). Although FIG. 15 illustrates an example in which the index information INDEX is stored in a plurality of blocks, the index information INDEX may be stored in one block as described above.

Subsequently, the host may provide a state request command StatQuery(KEY 1) for requesting the index information INDEX about the first value VALUE 1 to the storage device (operation S56). The controller CONTROLLER may provide an internal command CMD_I(RD_index) for reading the index information stored in the first to a-th blocks BLK 1 to BLK a to the non-volatile memory NVM in response to the state request command StatQuery(KEY 1) (operation S57). The non-volatile memory NVM may read the index information INDEX in response to the internal command CMD_I(RD_index) (operations S58 and S59). The controller may provide a response indicating that the outputting of the index information INDEX has been completed, to the host HOST (operation S60).

Figure 16:
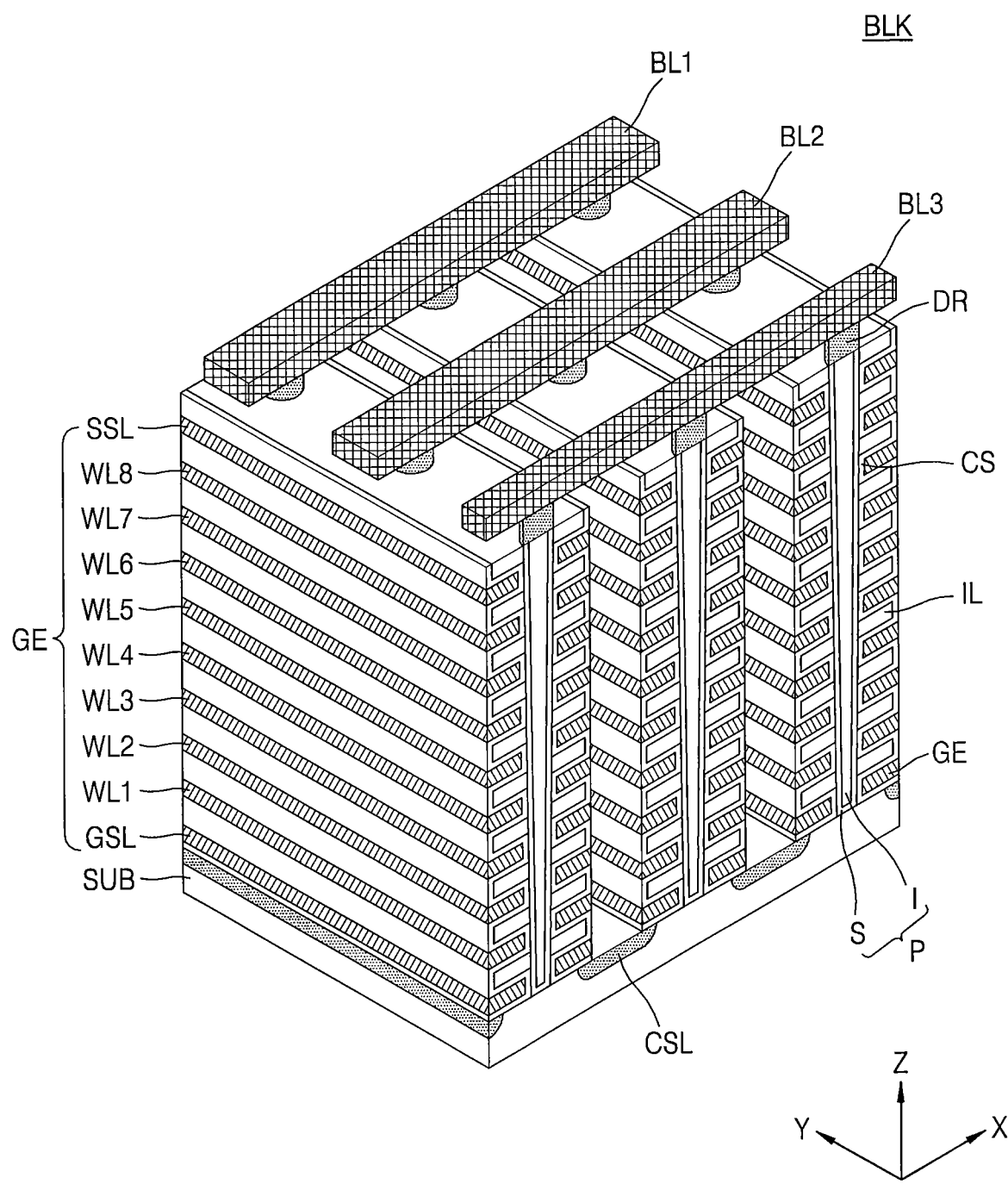
FIG. 16 is a perspective view of an embodied example of a non-volatile memory of a storage device of FIG. 1 and/or FIG. 11.

FIG. 16 is a perspective view of an embodied example of the non-volatile memory of the storage device 100 of FIG. 1 and/or the storage device 410 of FIG. 11. When the storage device 100/410 includes a flash memory chip, FIG. 16 illustrates an example in which each block of the flash memory chip is implemented as a three-dimensional (3D) type device.

Referring to FIG. 16, a memory block BLK of the non-volatile memory may be formed in a vertical direction to a substrate SUB. Although FIG. 16 illustrates an example in which the memory block BLK includes two selection lines GSL and SSL, eight word lines WL1 to WL8, and three bit lines BL1 to BL3, the memory block BLK may actually include more or fewer selection lines, word lines, and bit lines than those described above.

The substrate SUB may have a first conductivity type (e.g., a p type). A common source line CSL may be provided on the substrate SUB and extend in a first direction (e.g., a Y direction). The common source line CSL may be doped with impurities of a second conductivity type (e.g., an n type). A plurality of insulating films IL may be provided on a region of the substrate SUB between two adjacent common source lines CSL and extend in the first direction. The plurality of insulating films IL may be sequentially provided and spaced a predetermined distance apart from each other in a third direction (e.g., a Z direction). For example, the plurality of insulating films IL may include an insulating material, such as silicon oxide.

A plurality of pillars P may be provided on a region of the substrate SUB between two adjacent common source lines CSL and sequentially arranged in the first direction. The plurality of pillars P may pass through the plurality of insulating films IL in the third direction. For example, the plurality of pillars P may pass through the plurality of insulating films IL and contact the substrate SUB. Specifically, a surface layer S of each of the pillars P may include a first-type silicon material and function as a channel region. An inner layer I of each of the pillars P may include an insulating material (e.g., silicon oxide) and/or an air gap.

A charge storage layer CS may be provided along exposed surfaces of the insulating films IL, the pillars P, and the substrate SUB between two adjacent common source lines CSL. The charge storage layer CS may include a gate insulating layer (also referred to as a "tunnelling insulating layer"), a charge trap layer, and/or a blocking insulating layer. For example, the charge storage layer CS may have an oxide-nitride-oxide (ONO) structure. Also, gate electrodes GE, such as the selection lines GSL and SSL and the word lines WL1 to WL8, may be provided on exposed surfaces of the charge storage layer CS in a region between two adjacent common source lines CSL.

Drains or drain contacts DR may be provided on the plurality of pillars P, respectively. For example, the drains or drain contacts DR may include a silicon material doped with impurities of the second conductivity type. Bit lines BL1 to BL3 may be provided on the drains DR. The bit lines BL1 to BL3 may extend in a second direction (e.g., an X direction) and be spaced a predetermined distance apart from each other in the first direction.

Figure 17:
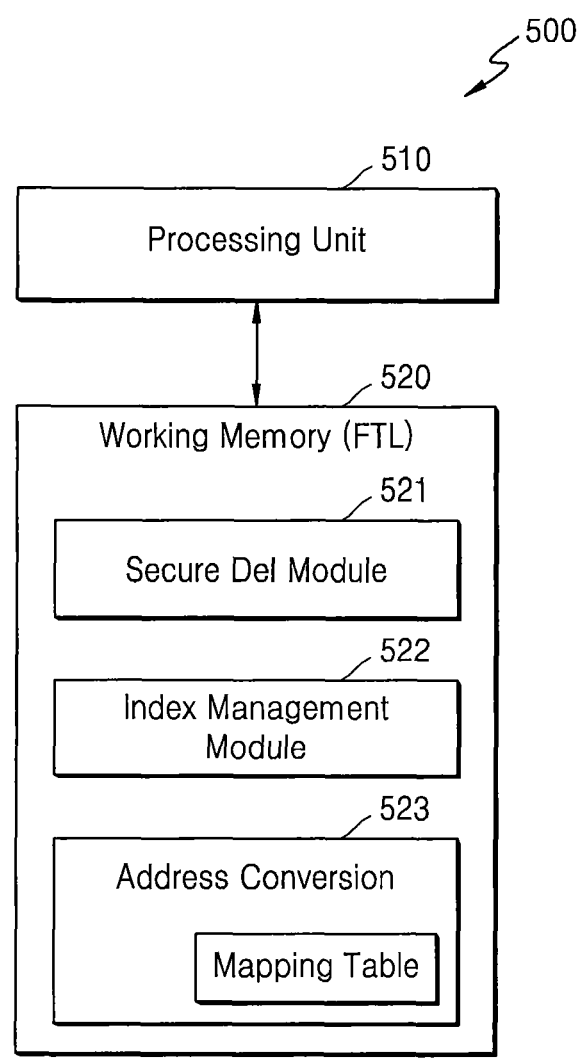
FIG. 17 is a block diagram illustrating an example in which a secure deletion operation and an index management operation are controlled using a software method according to an embodiment of the inventive concepts.

FIG. 17 is a block diagram illustrating an example in which a secure deletion operation and an index management operation are controlled using a software method according to an embodiment of the inventive concepts.

Referring to FIG. 17, a controller 500 may include a processing unit 510 and a working memory 520. When the controller 500 controls a non-volatile memory including a flash memory, an FTL may be loaded in the working memory 520. In this case, the FTL may include various modules configured to control a memory operation. As an example, the FTL may include a secure deletion module 521, an index management module 522, and an address conversion module 523 related to the secure deletion operation and the index management operation of the above-described embodiments. Also, the address conversion module 523 may include a mapping table. The controller 500 illustrated in FIG. 17 may be an embodiment of the controllers 110, 300, 411 described herein.

The secure deletion operation and the index management operation according to embodiments may be performed by executing software loaded in the working memory 520. The software may be stored in a storage unit (e.g., a non-volatile storage medium) included in the controller 500 or a storage device (not shown) including the controller 500, and loaded in the working memory 520. According to an embodiment, the working memory 520 may be implemented as a volatile memory or non-volatile memory, which may serve as a non-transitory computer-readable recording medium.

When a secure deletion command is provided from a host in connection with the secure deletion operation, the processing unit 510 may execute the secure deletion module 521 and control a series of operations according to the above-described embodiments. As an example, the processing unit 510 may perform a control operation such that at least one block to be erased may be determined by referring to the mapping table, and at least one block or a plurality of blocks may be erased in response to one secure deletion command.

In addition, when a command requiring the updating of index information is provided from the host in connection with the index management operation, the processing unit 510 may execute the index management module 522 and control an operation of storing and updating the index information. When a state request command is provided from the host, the processing unit 510 may control an operation of reading and outputting the index information.

Figure 18:
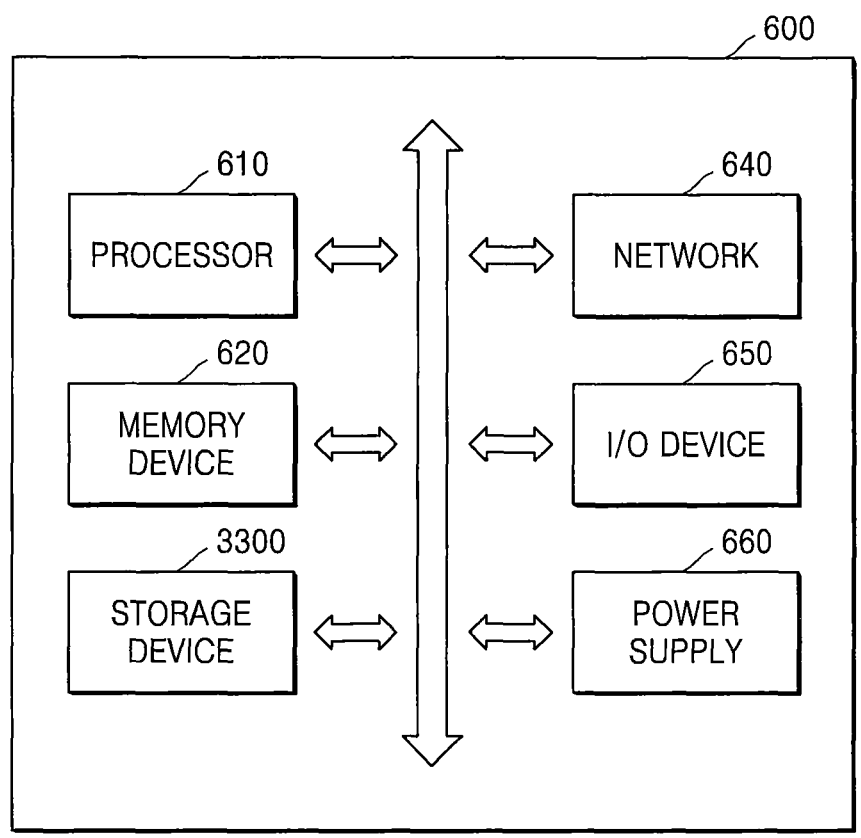
FIG. 18 is a block diagram of an electronic device according to an embodiment of the inventive concepts.

FIG. 18 is a block diagram of an electronic device 600 according to an embodiment of the inventive concepts.

Referring to FIG. 18, the electronic device 600 may include a processor 610, a memory device 620, a storage device 630, a network 640, an input/output (I/O) device 650, and a power supply 660. In an embodiment, the storage device 630 may be implemented using the embodiments described above with reference to FIGS. 1 to 17.

According to the storage device of the above-described example embodiments, a command (e.g., a state request command), which provides information on the use and utilization of data, may be defined, and index information may be provided to a host in response to the command. Also, in comparison to a block-interface-based storage device of the related art, the storage device of the above-described example embodiments may provide a secure deletion function at very high speed, and an overhead for a merge operation may be minimized during a secure deletion operation, thereby maximizing the lifespan of the storage device.

According to an embodiment, the secure deletion operation may be performed using a foreground and/or background operation. For example, when a secure deletion command SecureDel(KEY, VALUE) is provided from the host, the secure deletion operation may be preferentially performed (e.g., executed as a foreground operation). In some embodiments, when the secure deletion command SecureDel(KEY, VALUE) is provided from the host, the secure deletion operation may be performed as a background operation for other memory operations.

According to the example embodiment, a secure deletion command SecureDel({KEY 1, KEY 2, KEY 3, . . . }) for a plurality of keys may be defined, and the storage device may sequentially perform the above-described secure deletion operation on a set of keys. That is, a batch secure deletion operation may be performed on a plurality of files corresponding to the plurality of keys.

It will be understood that although the terms "first," "second," etc. are used herein to describe members, regions, layers, portions, sections, components, and/or elements in example embodiments of the inventive concepts, the members, regions, layers, portions, sections, components, and/or elements should not be limited by these terms. These terms are only used to distinguish one member, region, portion, section, component, or element from another member, region, portion, section, component, or element. Thus, a first member, region, portion, section, component, or element described below may also be referred to as a second member, region, portion, section, component, or element without departing from the scope of the inventive concepts. For example, a first element may also be referred to as a second element, and similarly, a second element may also be referred to as a first element, without departing from the scope of the inventive concepts.

The terminology used herein is for the purpose of describing particular embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," if used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by those of ordinary skill in the art to which the inventive concepts pertain. It will also be understood that terms, such as those defined in commonly used dictionaries, should be interpreted as having a meaning that is consistent with their meaning in the context of this specification and the relevant art and will not be interpreted in an idealized or overly formal sense unless expressly so defined herein.

As used herein, the term "and/or" includes any and all combinations of one or more of the associated listed items. Expressions such as "at least one of," when preceding a list of elements, modify the entire list of elements and do not modify the individual elements of the list.

In the accompanying drawings, variations from the illustrated shapes as a result, for example, of manufacturing techniques and/or tolerances, are to be expected. Thus, the example embodiments of the inventive concepts should not be construed as being limited to the particular shapes of regions illustrated herein but may be construed to include deviations in shapes that result, for example, from a manufacturing process. For example, an etched region illustrated as a rectangular shape may be a rounded or certain curvature shape. Thus, the regions illustrated in the figures are schematic in nature, and the shapes of the regions illustrated in the figures are intended to illustrate particular shapes of regions of devices and not intended to limit the scope of the present inventive concepts.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on").

When a certain example embodiment may be implemented differently, a specific process order may be performed differently from the described order. For example, two consecutively described processes may be performed substantially at the same time or performed in an order opposite to the described order.

Like numbers refer to like elements throughout. Thus, the same or similar numbers may be described with reference to other drawings even if they are neither mentioned nor described in the corresponding drawing. Also, elements that are not denoted by reference numbers may be described with reference to other drawings.

Typical example embodiments of the inventive concepts are disclosed in the above description and the drawings. Although specific terms are employed, they are used in a generic and descriptive sense only and not for purposes of limitation. It will be understood by those of ordinary skill in the art that various changes in form and details may be made to the disclosed embodiments without departing from the spirit and scope of the inventive concepts as defined by the following claims.

What is claimed is:

1. A key-value storage device comprising:
a non-volatile memory comprising a plurality of blocks; and
a controller configured to control a memory operation on the non-volatile memory, receive a write command comprising a first key and a first value corresponding to the first key from a host, write data of a file corresponding to the first value to at least one block of the plurality of blocks of the non-volatile memory in response to the write command, receive a secure deletion command for the first value from the host, and erase the at least one block to which the first value is written in response to the secure deletion command,
wherein the controller comprises:
a secure deletion control module configured to determine the at least one block to be erased, in response to the secure deletion command for the first value, and control an erase operation on the at least one block; and
a mapping table configured to store mapping information between physical addresses of the at least one block to which the first value is written and the first key.

2. The key-value storage device of claim 1, wherein the at least one block comprises a first block and a second block, and
the controller is further configured to erase the at least one block by performing the erase operation on the first block and the second block in response to the secure deletion command for the first value.

3. The key-value storage device of claim 1, wherein, after the erase operation on the at least one block is completed, the controller is further configured to provide a response indicating completion of a secure deletion operation on the first value to the host.

4. The key-value storage device of claim 1, wherein the at least one block of the plurality of blocks comprises a first block, and the first block further stores valid data of a second value,
wherein, responsive to receiving the secure deletion command for the first value, the controller is further configured to determine a second block of the plurality of blocks in which the second value is stored and copy the valid data of the second value stored in the first block to the second block before the erase operation on the first block.

5. The key-value storage device of claim 1, wherein the at least one block of the plurality of blocks comprises a first block, and
wherein the controller is further configured to write the first value to first pages of the first block and maintain remaining pages of the first block other than the first pages in an invalid state without writing values other than the first value to the remaining pages of the first block.

6. The key-value storage device of claim 3, wherein the at least one block comprises a first block and a second block, and
wherein responsive to receiving the secure deletion command for the first value and prior to providing the response indicating the completion of the secure deletion operation, the controller is further configured to perform a copy operation on valid data and the erase operation on the second block after a copy operation on the valid data and the erase operation on the first block is completed.

7. The key-value storage device of claim 1, wherein the controller is further configured to receive a write command for the first value and store index information in the non-volatile memory,
wherein the index information comprises state information related to the first value, and
wherein the controller is further configured to receive a state request command for the first value from the host, read the index information in response to the state request command, and provide the index information to the host.

8. The key-value storage device of claim 7, wherein the index information comprises at least one of a data write time, a data access count, a data change history, and a data change count of the first value.

9. The key-value storage device of claim 8, wherein the at least one block comprises a first block and a second block, and index information related to the first value is stored in each of the first block and the second block,
wherein the controller is further configured to sequentially read the index information stored in the first block and the second block in response to the state request command for the first value.

10. The key-value storage device of claim 1, wherein the at least one block is a physical unit of the erase operation of the non-volatile memory, and
wherein the erase operation on the at least one block physically erases the at least one block to remove the first value.

11. A method of operating a key-value storage device, the key-value storage device comprising a non-volatile memory comprising a plurality of blocks and a controller configured to control a memory operation, the method comprising:
receiving a write command comprising a first key and a first value corresponding to the first key from a host and writing data of a file corresponding to the first value to at least one block of the plurality of blocks of the non-volatile memory in response to the write command;
receiving a secure deletion command for the first value from the host and determining the at least one block to which the first value is written, in response to the secure deletion command; and
erasing the at least one block,
wherein the writing of the data of the file corresponding to the first value to the at least one block comprises writing the first value to first pages of a first block, and
wherein remaining pages of the first block other than the first pages are maintained in an invalid state without writing data other than the first value to the remaining pages of the first block.

12. The method of claim 11, wherein the at least one block comprises a first block and a second block, and
wherein the erasing of the at least one block comprises sequentially erasing the first block and the second block in response to the secure deletion command.

13. The method of claim 12, further comprising providing a response indicating completion of a secure deletion operation to the host after the erasing of the first block and the second block is completed.

14. The method of claim 11, further comprising:
writing index information comprising state information of the first value to the at least one block of the non-volatile memory in response to the receiving of the write command; and
receiving a state request command for the first value from the host and reading the index information in response to the state request command.

15. The method of claim 11, wherein writing the data of the file corresponding to the first value to the at least one block of the plurality of blocks of the non-volatile memory in response to the write command comprises storing a first physical address of the at least one block in a mapping table that maps the first key to the first physical address.

16. A key-value storage device comprising:
a non-volatile memory comprising a plurality of blocks; and
a controller configured to perform operations comprising:
receiving a secure deletion command comprising first data from a host, wherein the first data comprises a first key having a variable size;
determining at least one block of the plurality of blocks of the non-volatile memory that contains a first value corresponding to the first key;
erasing the at least one block that contains the first value in response to the secure deletion command; and
after erasing the at least one block, providing a response to the secure deletion command to the host,
wherein the at least one block of the plurality of blocks comprises a first block that stores valid data of a second value, and
wherein, responsive to receiving the secure deletion command for the first value and prior to providing the response to the secure deletion command, the controller is further configured to determine a second block of the plurality of blocks in which the second value is stored and copy the valid data of the second value stored in the first block to the second block before an erase operation on the first block.

17. The key-value storage device of claim 16, wherein the controller is further configured to:
prior to receiving the secure deletion command, receive a write command comprising the first key and the first value corresponding to the first key from the host; and write the first value to the at least one block of the non-volatile memory.

18. The key-value storage device of claim 17, wherein the controller is further configured to store index information in the at least one block in response to the write command, and
wherein the index information comprises state information related to the first value.

19. The key-value storage device of claim 16, wherein the first data does not comprise a physical address or virtual address of the at least one block, and
wherein the controller is further configured to determine the physical address of the at least one block based on a hash generated from the first key.

20. The key-value storage device of claim 16, wherein determining the at least one block of the plurality of blocks of the non-volatile memory that contains the first value corresponding to the first key comprises retrieving a first physical address of the at least one block from a mapping table that maps the first key to the first physical address.

* * * * *